United States Patent
Cariou et al.

(10) Patent No.: US 10,159,060 B2
(45) Date of Patent: Dec. 18, 2018

(54) COORDINATED BASIC SET (BSS) COMMUNICATION WITH DIFFERENT MODULATION CODING SCHEME (MCS) PER LINK

(71) Applicant: INTEL CORPORATION, Santa Clara, CA (US)

(72) Inventors: Laurent Cariou, Portland, OR (US); Juan Fang, Hillsboro, OR (US); Shahrnaz Azizi, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 38 days.

(21) Appl. No.: 15/392,075

(22) Filed: Dec. 28, 2016

(65) Prior Publication Data

US 2018/0184402 A1    Jun. 28, 2018

(51) Int. Cl.
  *H04W 72/04* (2009.01)
  *H04W 74/08* (2009.01)
  *H04W 76/20* (2018.01)
  *H04W 92/20* (2009.01)

(52) U.S. Cl.
  CPC ....... *H04W 72/04* (2013.01); *H04W 74/0816* (2013.01); *H04W 76/20* (2018.02); *H04W 92/20* (2013.01)

(58) Field of Classification Search
  CPC ..... H04W 72/04; H04W 74/04; H04W 74/20; H04W 76/0816
  See application file for complete search history.

(56) References Cited

U.S. PATENT DOCUMENTS

| | | | |
|---|---|---|---|
| 2006/0268886 A1 | 11/2006 | Sammour et al. | |
| 2007/0191052 A1 | 8/2007 | Kneckt et al. | |
| 2010/0150177 A1* | 6/2010 | Cai | H04B 7/026 370/476 |
| 2011/0149887 A1* | 6/2011 | Khandekar | G01S 5/0081 370/329 |
| 2011/0287798 A1* | 11/2011 | Ono | H04B 7/024 455/509 |
| 2011/0305195 A1* | 12/2011 | Forck | H04B 7/022 370/328 |

(Continued)

OTHER PUBLICATIONS

U.S. Appl. No. 15/391,210, filed Dec. 27, 2016, Trainin et al.

(Continued)

*Primary Examiner* — Gary Mui
(74) *Attorney, Agent, or Firm* — Jason H. Vick; Sheridan Ross, PC

(57) ABSTRACT

Methodologies are presented that provide better uplink and downlink data throughput for cell-edge stations (CE STAs) in wireless networks. In downlink, two or more access points (AP) can work in concert to code a signal such that each AP sends a portion of the data during concurrent transmissions. To further enhance the data throughput of a CE STA, each link between the CE STA and one of the APs can have different characteristics or parameters, for example, a different modulation and coding scheme (MCS). The different characteristics or parameters are communicated to the CE STA through one of various signals sent to the CE STA to allow the CE STA to receive the portions of data over the differently configured links.

18 Claims, 38 Drawing Sheets

(56) References Cited

U.S. PATENT DOCUMENTS

| | | | |
|---|---|---|---|
| 2012/0033624 A1* | 2/2012 | Luo | H04B 7/024 370/329 |
| 2013/0089159 A1* | 4/2013 | Liu | H04B 7/024 375/267 |
| 2013/0223343 A1* | 8/2013 | Wentink | H04B 7/0452 370/328 |
| 2014/0022988 A1* | 1/2014 | Davydov | H04W 88/02 370/328 |
| 2015/0334650 A1 | 11/2015 | Park | |
| 2015/0358989 A1* | 12/2015 | Ni | H04W 72/1226 370/330 |
| 2016/0119881 A1 | 4/2016 | Merlin et al. | |
| 2016/0183274 A1 | 6/2016 | Trainin et al. | |
| 2017/0041059 A1* | 2/2017 | Yi | H04B 7/024 |
| 2017/0367096 A1* | 12/2017 | Park | H04W 28/18 |
| 2018/0034595 A1* | 2/2018 | Kim | H04L 1/1671 |
| 2018/0069678 A1* | 3/2018 | Kim | H04L 5/0055 |

OTHER PUBLICATIONS

IEEE 80211-2012 "IEEE Standard Information Technology: Part 11: Wireless LAN Medium Access Control (MAC) and Physical Layer (PHY) Specifications" Mar. 29, 2012 (2793 pages).

IEEE P802.11ad-2012 "IEEE Standard for Information Technology: Part 11: Wireless LAN Medium Access Control (MAC) and Physical Layer (PHY) Specifications—Amendment 3: Enhancements for Very High Throughput in the 60GHz Band" Dec. 28, 2012 (628 pages).

IEEE P802.11ac-2013 "IEEE Standard for Information Technology—Part 11: Wireless LAN Medium Access Control (MAC) and Physical Layer (PHY) Specifications—Amendment 4: Enhancements for Very High Throughput for Operation in Bands below 6GHz" 2013 (425 pages).

Wi-Fi Peer-to-Peer (P2P) Technical Specification; Version 1.5; 2014 (183 pages).

International Standard "Information Technology—Telecommunications and Information Exchange Between Systems—Local and Metropolitan Area Networks—Specific Requirements—Part 11: Wireless LAN medium access control (MAC) and physical layer (PHY) specifications; Amendment 3: Enhancements for very high throughput in the 60 GhZ band (adoption of IEEE Std 802.11ad-2012)" ISO/IEC/IEEE 8802-11; First Edition: Nov. 11, 2012; Amendment 3; Mar. 15, 2014 (634 pages).

Stephens, Adrian "TGn LB97 Submission Relating to ad-hoc MAC comment-group RD (Reverse Direction)" IEEE 802.11-07/0575r3; May 2007.

Office Action for U.S. Appl. No. 15/391,210, dated Apr. 23, 2018.
Office Action for U.S. Appl. No. 15/391,210, dated Sep. 27, 2018.

* cited by examiner

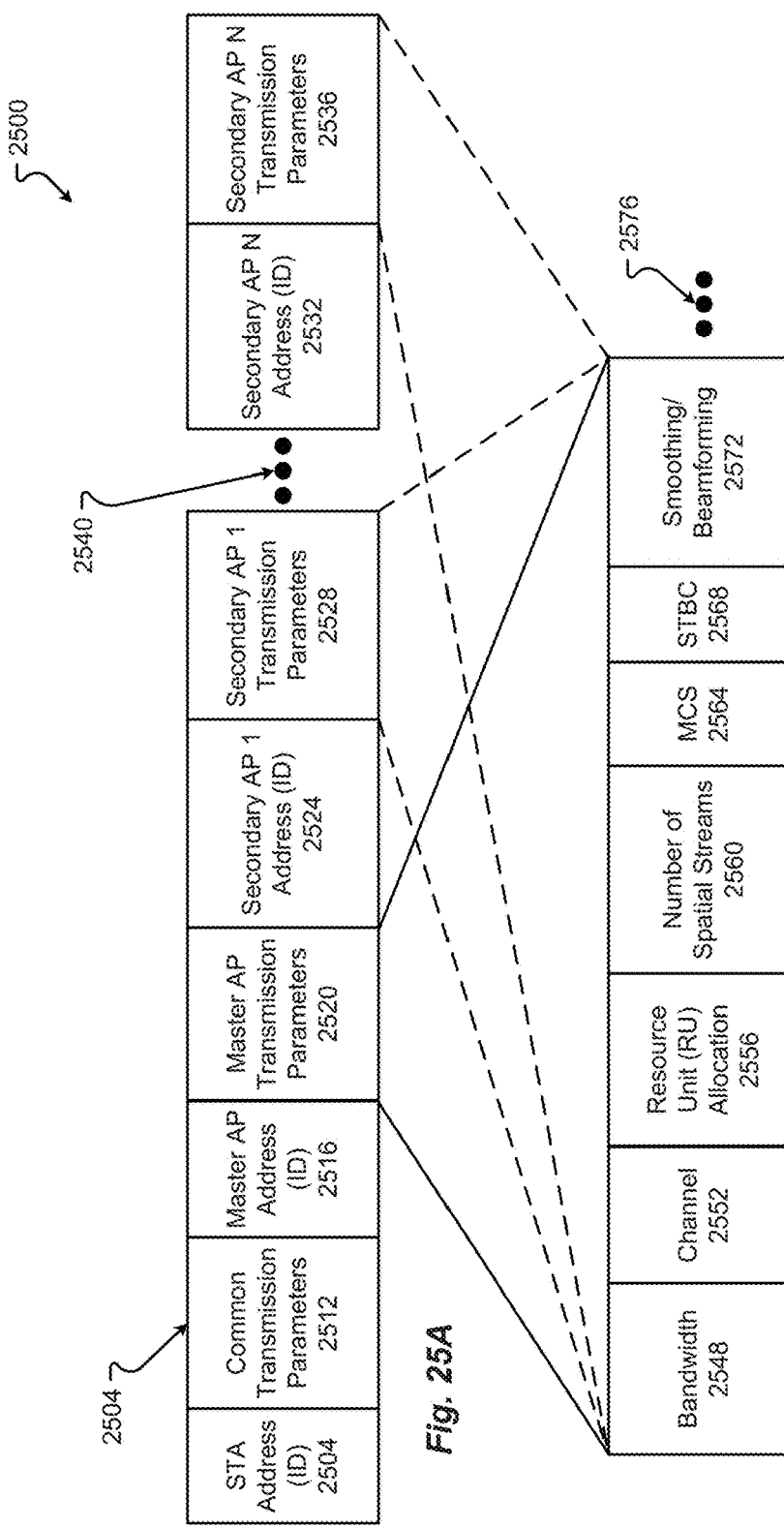

COORDINATED BASIC SET (BSS) COMMUNICATION WITH DIFFERENT MODULATION CODING SCHEME (MCS) PER LINK

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11n/ac/ax/ . . . communications systems and in general any wireless communications system or protocol, such as 4G, 4G LTE, 5G and later, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard, the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to IEEE 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

IEEE 802.11ac supports high physical data rate using a wider channel bandwidth (i.e. 80 MHz or optionally 160 MHz). However, due to the propagation loss, a STA at the edge of the coverage area of a basic service set (BSS) cannot support 80 MHz transmission/reception. Therefore, the physical data rate to a cell-edge STA (CE STA) is much lower than that to the non-cell-edge STA (non-CE STA). For example, in an environment with four access points (APs) located at the four corners of a large 40 m×40 m room, a STA will follow the rules defined in IEEE 802.11 specification to connect with the nearest AP. The physical data rate to the STA in the middle of the room is much lower than that for a second STA near one of the four corners, where the STA is closer to the AP.

A Coordinated Multi-Point (CoMP) strategy, which performs joint precoding among coordinated APs to mitigate the inter-cell interference, is considered as one solution to improve the performance of CE STAs. However, each link between an AP in the CoMP BSS and the CE STA can have different Signal to Noise Ratios and other unique signal characteristics. Thus, specific modulation and coding schemes (MCS) for each link may be needed to best optimize the separate links for data transmission. However, if each AP selects a tailored MCS, the CE STA will need to obtain the MCS information to receive the data properly. There is no procedure currently to provide the MCS information from each AP to the CE STA.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 25A is illustrates an embodiment of a frame sent to inform the CE STA or an AP about link parameters;

FIG. 25B is illustrates an embodiment of a link parameter (s) sent to the CE STA or an AP;

DESCRIPTION OF EMBODIMENTS

Figure 1A:
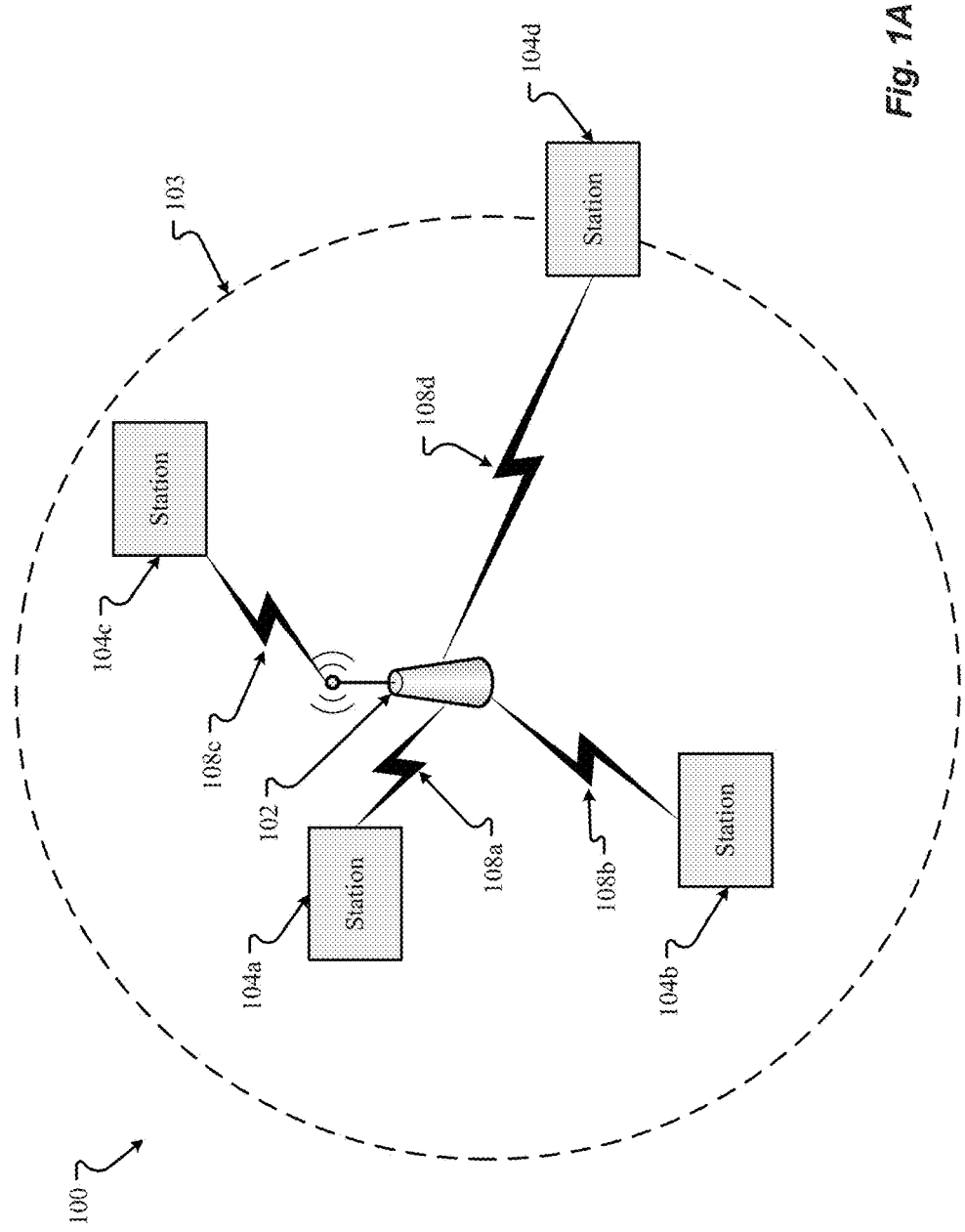
FIG. 1A illustrates an embodiment of an environment having a CE STA.

The embodiments presented herein provide better uplink and downlink data throughput for CE STAs. In downlink, two or more APs can work in concert to send a signal such that each AP sends a portion of the data during concurrent transmissions. Thus, the amount of data downloaded to the CE STA increases based on the number of APs in the environment.

This environment is further enhanced by allowing link-specific Modulation and Coding Schemes (MCS), as explained further below.

Some embodiments may involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, IEEE 802.11ay, and/or other present or future IEEE 802.11 standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/ or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 which may be representative of various configurations described herein. The WLAN 103 may comprise a basic service set (BSS) that may include a master station 102 and one or more other stations (STAs) 104. The master station 102 may be an access point (AP) using the IEEE 802.11 to transmit and receive. Hereinafter, the term AP will be used to identify the master station 102. The AP 102 may be a base station and may use other communications protocols as well as the IEEE 802.11 protocol. The IEEE 802.11 protocol may be the IEEE 802.11ax or later standard. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The STAs 104 may include one or more high-efficiency wireless (HEW) (as illustrated in, e.g., the IEEE 802.11ax standard) STAs 104 a, b, d and/or one or more legacy (as illustrated in, e.g., the IEEE 802.11n/ac standards) STAs 104c. The legacy STAs 104c may operate in accordance with one or more of IEEE 802.11 a/b/g/n/ac/ad/af/ah/aj, or another legacy wireless communication standard. The HEW STAs 104 a, b, d may be wireless transmit and receive devices, for example, a cellular telephone, a smart telephone, a handheld wireless device, wireless glasses, a wireless watch, a wireless personal device, a tablet, or another device that may be transmitting and receiving using a IEEE 802.11 protocol, for example, the IEEE 802.11ax or another wireless protocol. In the operating environment 100, an AP 102 may generally manage access to the wireless medium in the WLAN 103.

Within the environment 100, one or more STAs 104a, 104b, 104c, 104d may associate and/or communication with the AP 102 to join the WLAN 103. Joining the WLAN 103 may enable STAs 104a-104d to wirelessly communicate with each other via the AP 102, with each other directly, with the AP 102, or to another network or resource through the AP 102. In some configurations, to send data to a recipient (e.g., STA 104a), a sending STA (e.g., STA 104b) may transmit an uplink (UL) physical layer convergence procedure (PLCP) protocol data unit (PPDU) comprising the data to AP 102, which may then send the data to the recipient STA 104a, in a downlink (DL) PPDU.

In some configurations, a frame of data transmitted between the STAs 104 or between a STA 104 and the AP 102 may be configurable. For example, a channel used in for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

At a given point in time, multiple STAs 104a-d, in the WLAN 103, may wish to send data. In some configurations, rather than scheduling medium access for STAs 104a-d in different respective UL time intervals, the AP 102 may schedule medium access for STAs 104a-d to support UL multi-user (MU) transmission techniques, according to which multiple STAs 104a-d may transmit UL MU PPDUs to the AP 102 simultaneously during a given UL time interval. For example, by using UL MU OFDMA techniques during a given UL time interval, multiple STAs 104a-d may transmit UL MU PPDUs to AP 102 via different respective OFDMA resource units (RUs) allocated by AP 102. In another example, by using UL MU multiple-input multiple-output (MU-MIMO) techniques during a given UL time interval, multiple STAs 104a-d may transmit UL MU PPDUs to the AP 102 via different respective spatial streams allocated by the AP 102.

To manage access, the AP 102 may transmit a HEW master-sync transmission, which may be a trigger frame (TF) or a control and schedule transmission, at the beginning of the control period. The AP 102 may transmit a time duration of the TXOP and sub-channel information. During the HEW control period, HEW STAs 104 a, b, d may communicate with the AP 102 in accordance with a non-contention based multiple access technique such as OFDMA or MU-MIMO. This HEW technique is unlike conventional WLAN communications in which devices communicate in accordance with a contention-based communication technique, rather than a multiple access technique. During the HEW control period, the AP 102 may communicate with stations 104 using one or more control frames, and the STAs 104 may operate on a sub-channel smaller than the operating range of the AP 102. Also, during the control period, legacy stations may refrain from communicating by entering a deferral period.

During the HEW master-sync transmission, the STAs 104 may contend for the wireless medium with the legacy devices 106 being excluded from contending for the wireless medium during the HEW master-sync transmission. The trigger frame used during this HEW master-sync transmission may indicate an UL-MU-MIMO and/or UL OFDMA control period. The multiple-access technique used during the control period may be a scheduled OFDMA technique, or alternatively, may be a TDMA technique, a frequency division multiple access (FDMA) technique, or a SDMA technique.

The AP 102 may also communicate with legacy stations and/or HEW stations 104 in accordance with legacy IEEE 802.11 communication techniques. In some configurations, the AP 102 may also be configurable to communicate with HEW stations 104 outside the HEW control period in accordance with legacy IEEE 802.11 communication techniques, although this is not a requirement.

Figure 1B:
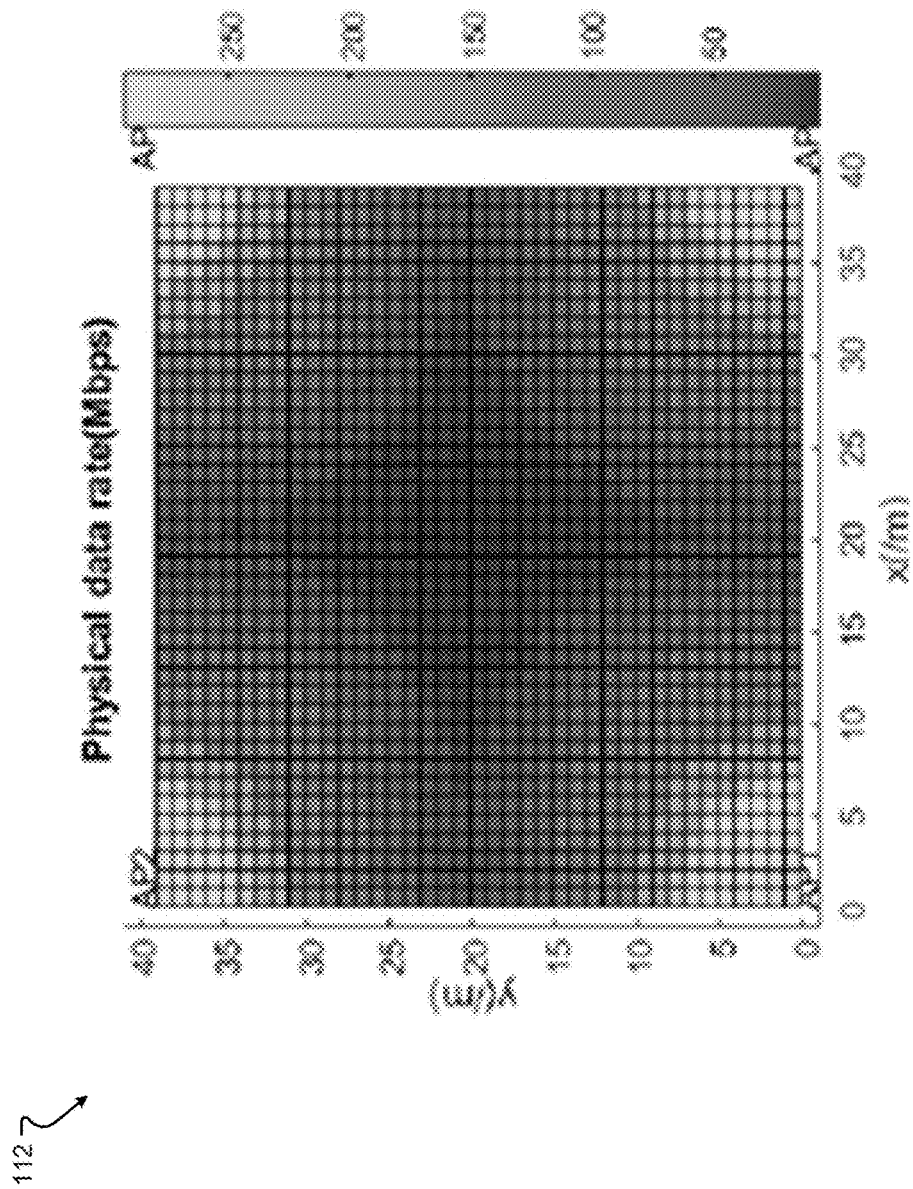
FIG. 1B illustrates a realized physical data rate for downlink for a STA based on location.
Figure 1C:
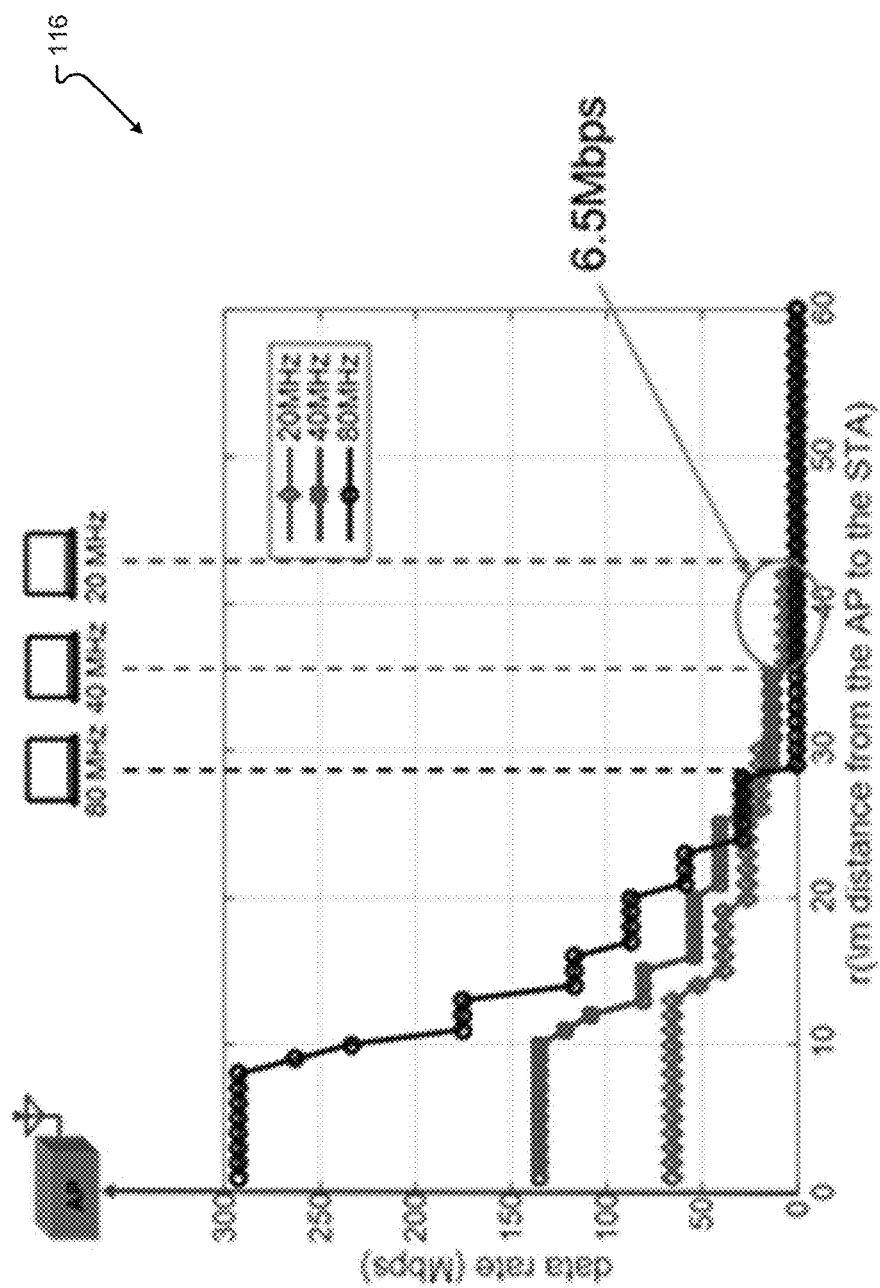
FIG. 1C illustrates a realized physical data rate from an AP to a CE STA based on location with different channel bandwidth.

STA 104d represents a CE STA as STA 104d is at the edge of WLAN 103. The CE STA 104d may have a lower data throughput with AP 102 due to signal propagation issues. The chart 112 in FIG. 1B demonstrates how a CE STA 104d further from an AP (or multiple APs as shown in FIG. 1B), the physical data rate to/from the CE STA 104d drops. Another representation of the issues with data throughput with a CE STA 104d is shown in chart 116 provided in FIG. 1C. Data throughput can be increased for a CE STA 104d that can associate with multiple APs 102, as shown in FIG. 2.

Figure 2:
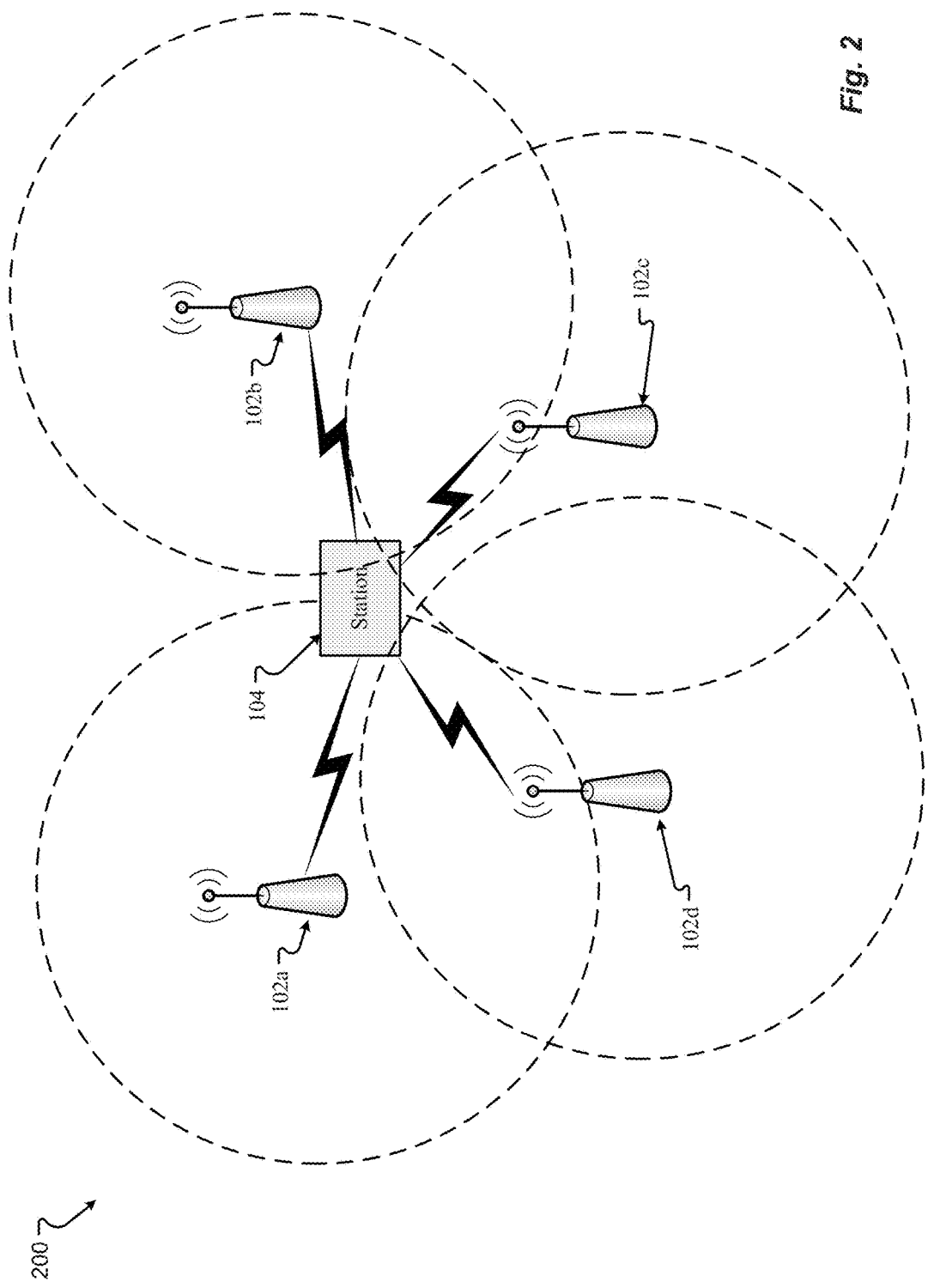
FIG. 2 illustrates another embodiment of an environment having a CE STA using a multiple access point channel bonding transmission technique.
Figure 3A:
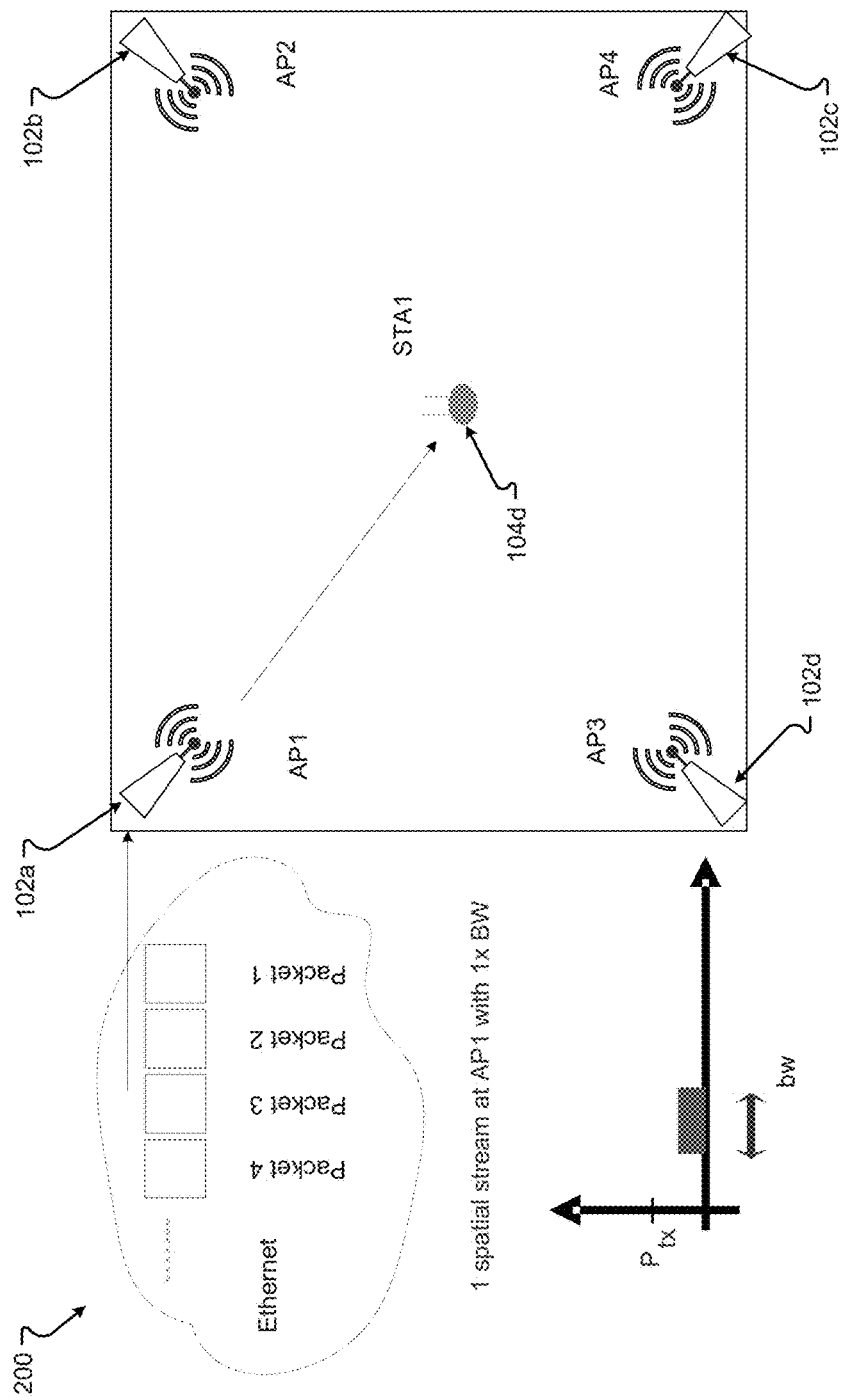
FIG. 3A illustrates an embodiment of an environment having a CE STA using a single access point transmission technique.
Figure 3B:
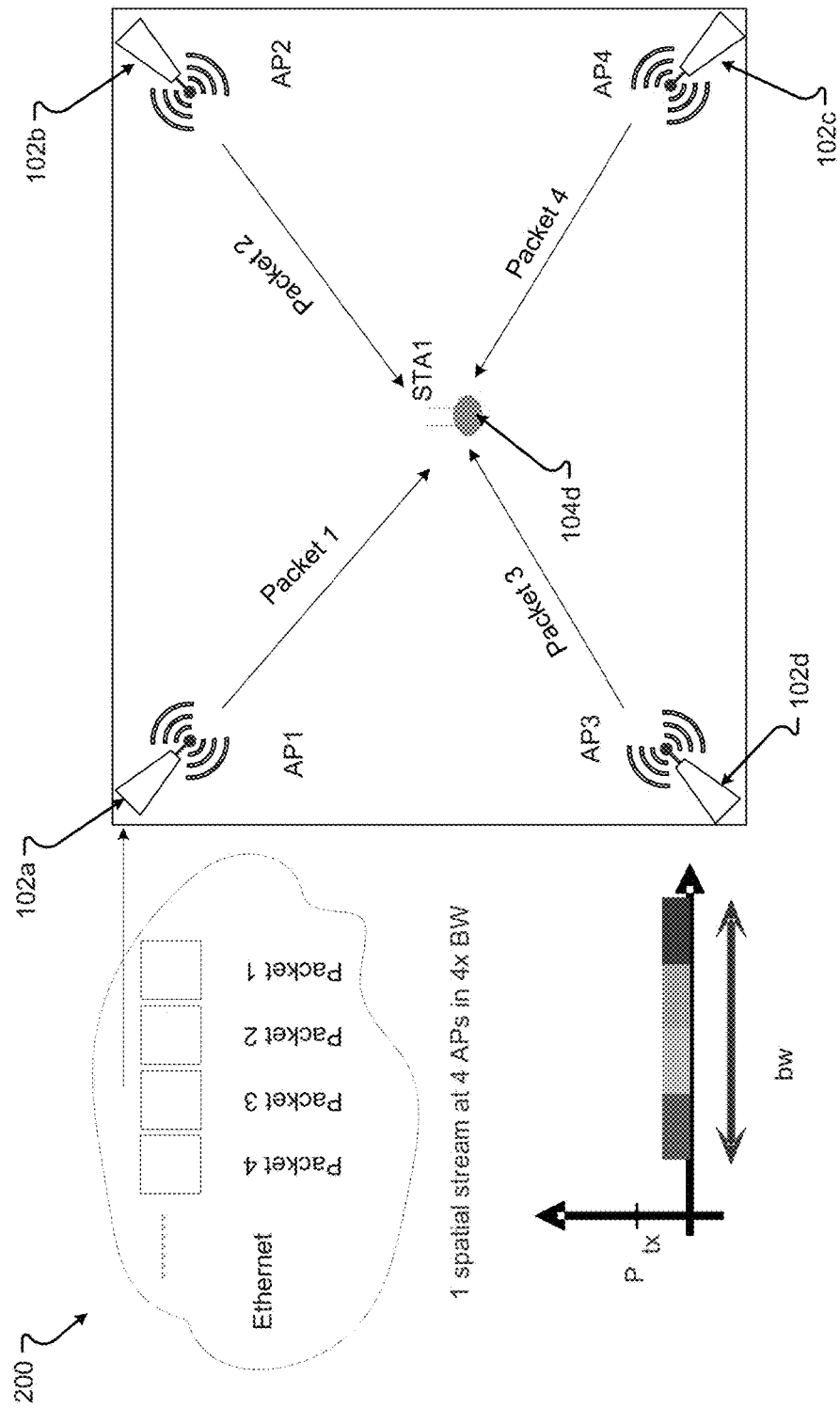
FIG. 3B also illustrates an embodiment of an environment having a CE STA using a multiple access point channel bonding transmission technique.
Figure 4:
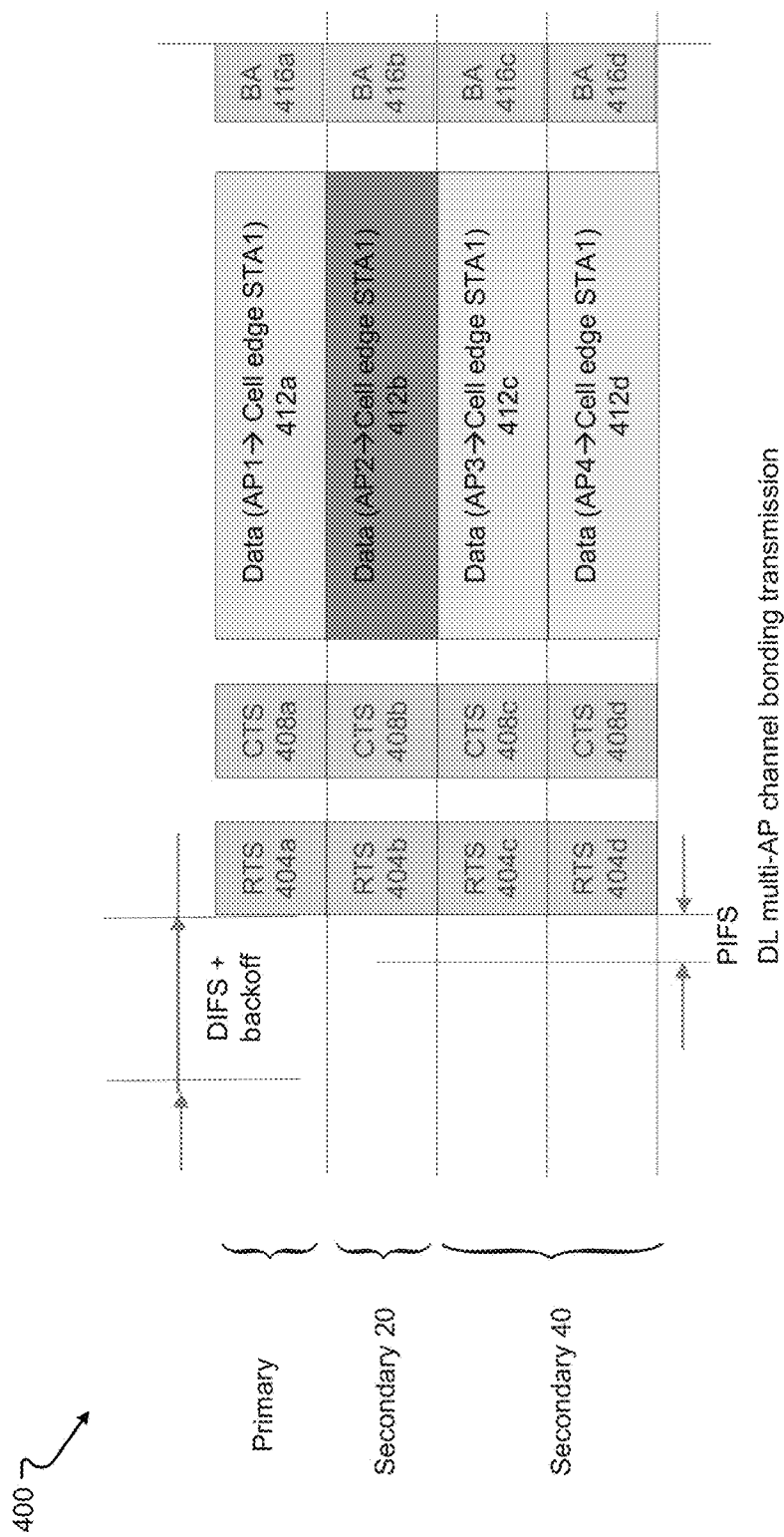
FIG. 4 illustrates an embodiment of a procedure of multiple AP channel bonding transmission.

FIGS. 2 and 3B illustrate an example of an environment 200 where a CE STA 104d can associated with multiple APs 102a-102-d. In this environment 200, as shown in FIG. 3B, there are four APs 102a-102d that can be using the same 80 MHz channel. The APs 102 may be physically located at a distance from each other and from the CE STA 104d, for example, at the four corners of a large room.

Figure 6A:
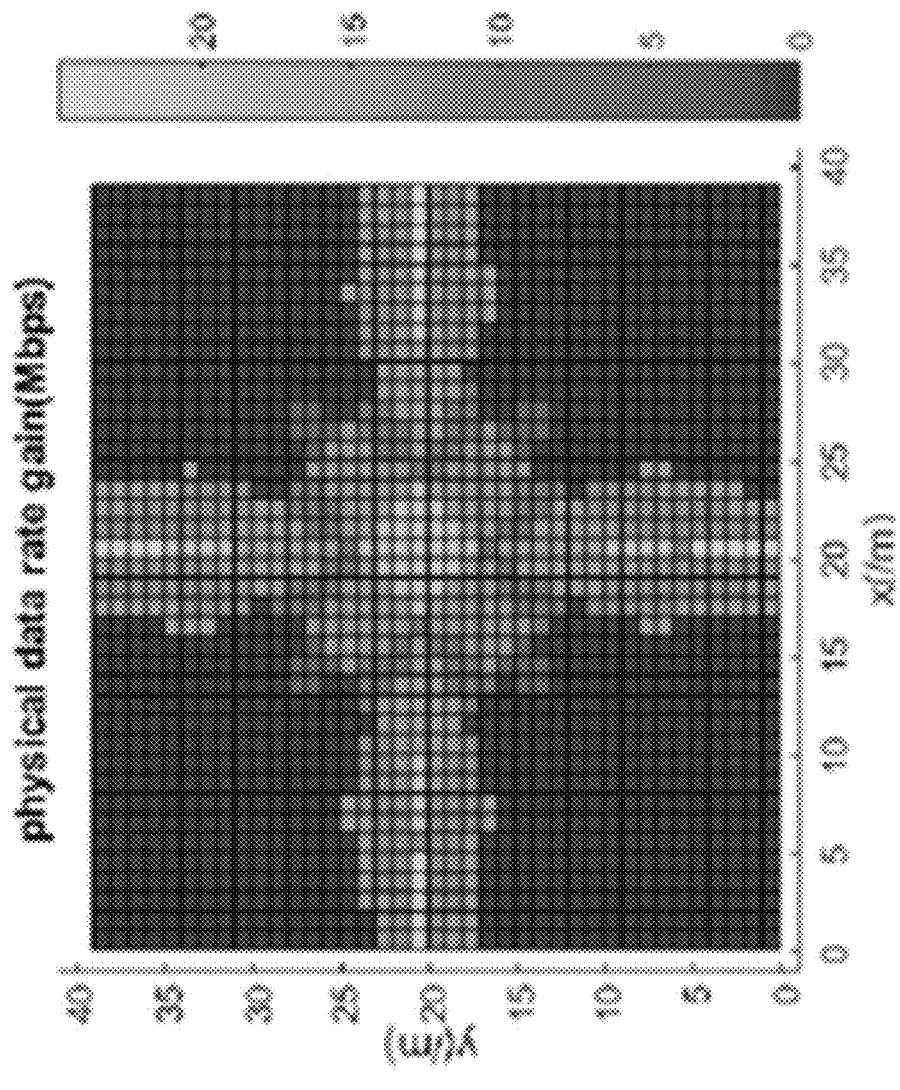
FIG. 6A illustrates a realized physical data rate gain for downlink for a CE STA based on location for the system using the multiple access point channel bonding transmission technique.
Figure 6B:
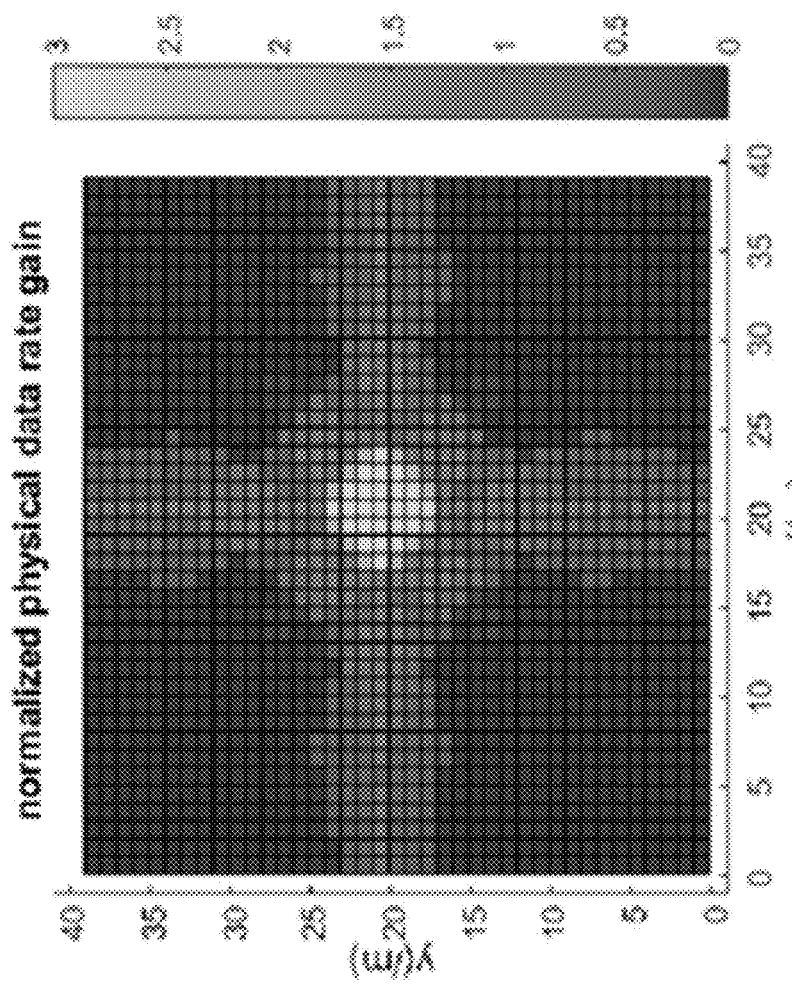
FIG. 6B also illustrates a realized normalized physical data rate gain for downlink for a CE STA based on location for the system using the multiple access point channel bonding transmission technique.
Figure 7:
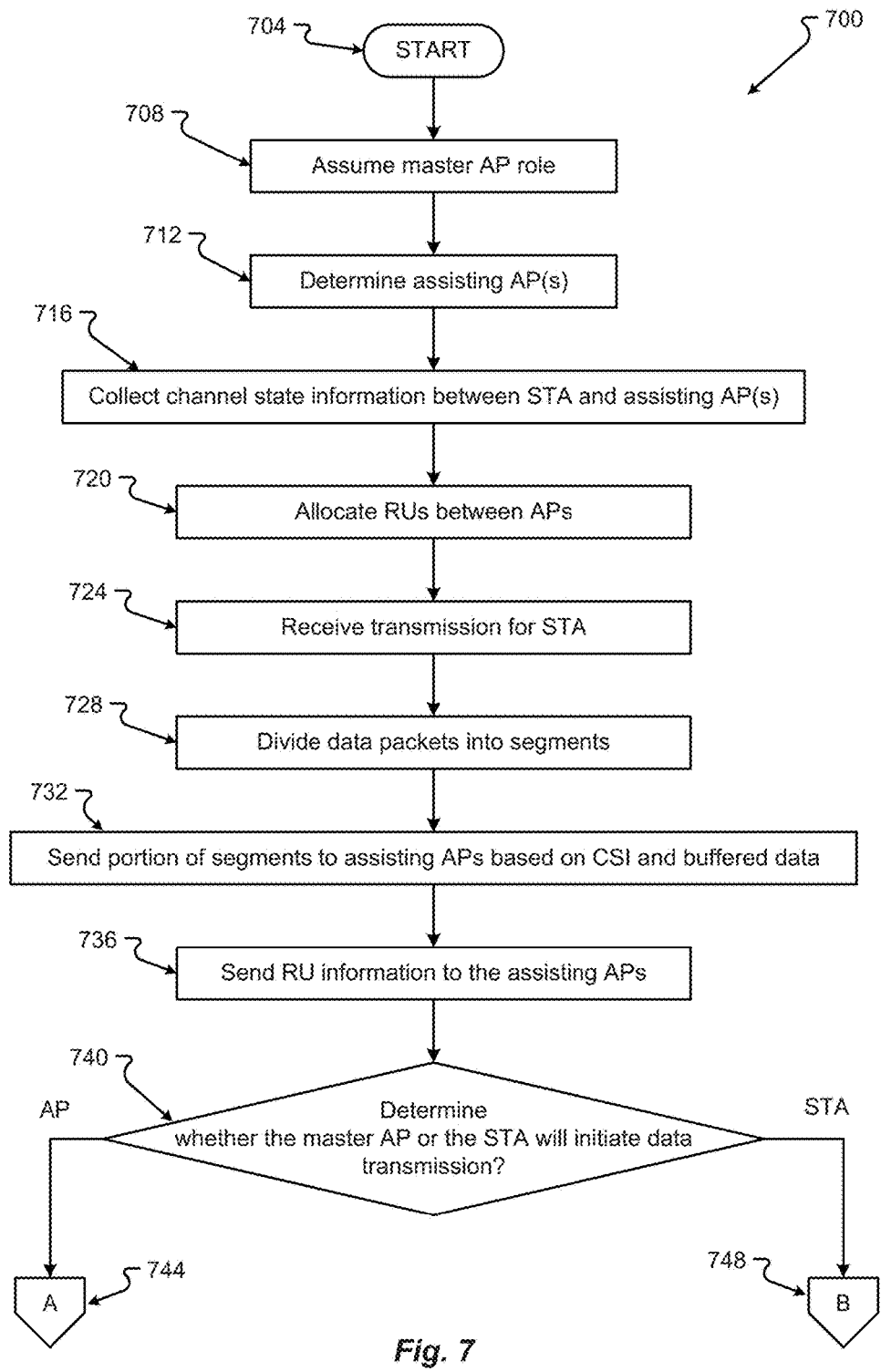
FIG. 7 is a flowchart outlining an exemplary technique for using a multiple access point channel bonding transmission technique.
Figure 8A:
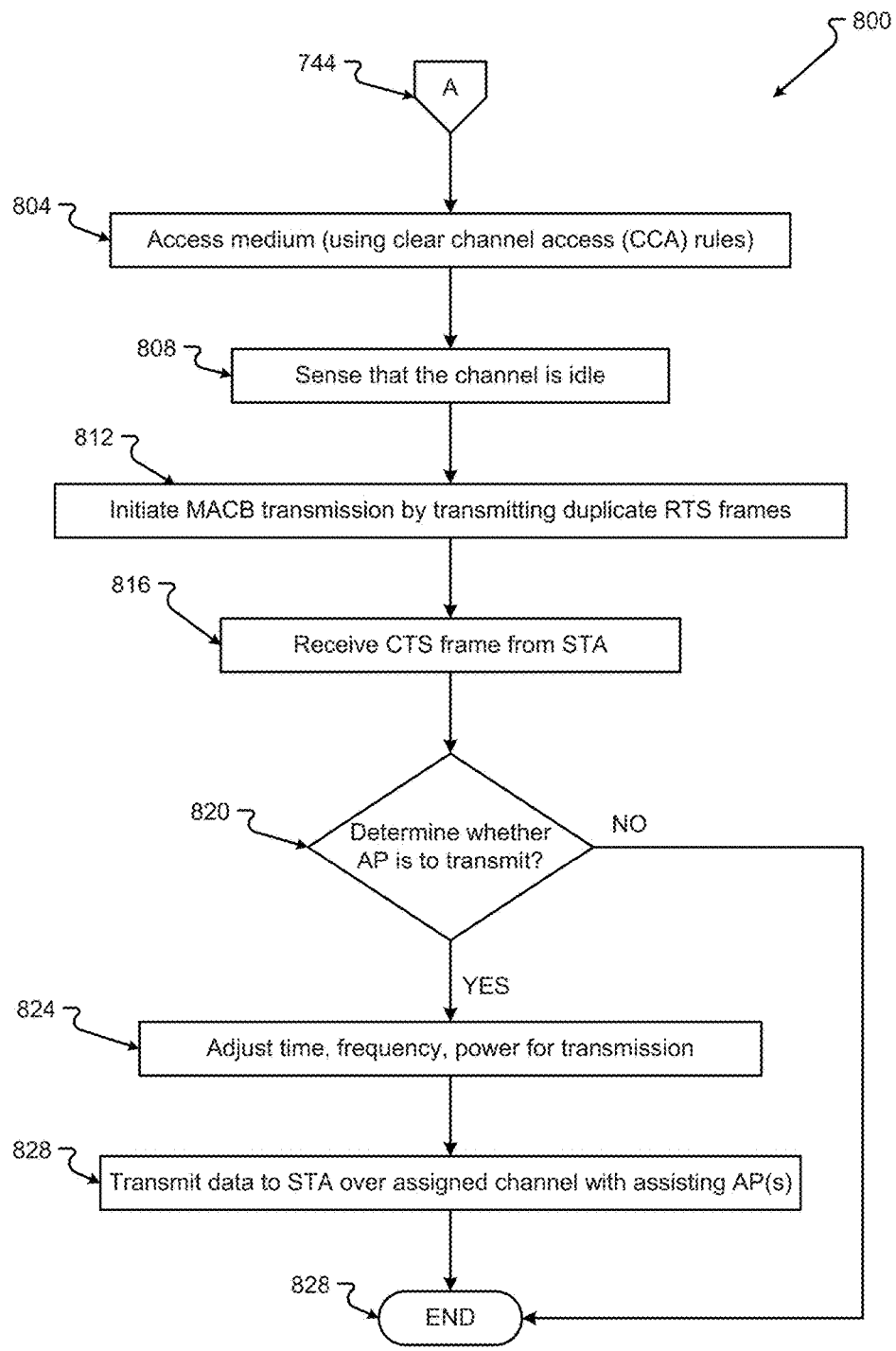
FIG. 8A is another flowchart outlining an exemplary technique for using a multiple access point channel bonding transmission technique.

The processes 700, 800 conducted by the AP 102a may be as shown in FIGS. 7 and 8A. A general order for the steps of the methods 700 and 800 is shown in FIGS. 7 and 8A. Generally, the methods 700, 800 start with a start operation 704 and ends with operation 828. The methods 700, 800 can include more or fewer steps or can arrange the order of the steps differently than those shown in FIGS. 7, 8A. The method 700, 800 can be executed as a set of computer-executable instructions executed by a computer system or processor and encoded or stored on a computer readable medium. Hereinafter, the method 700, 800 shall be explained with reference to the systems, components, circuits, modules, software, data structures, signalling processes, etc. described in conjunction with FIGS. 1-6B and 21.

Figure 8B:
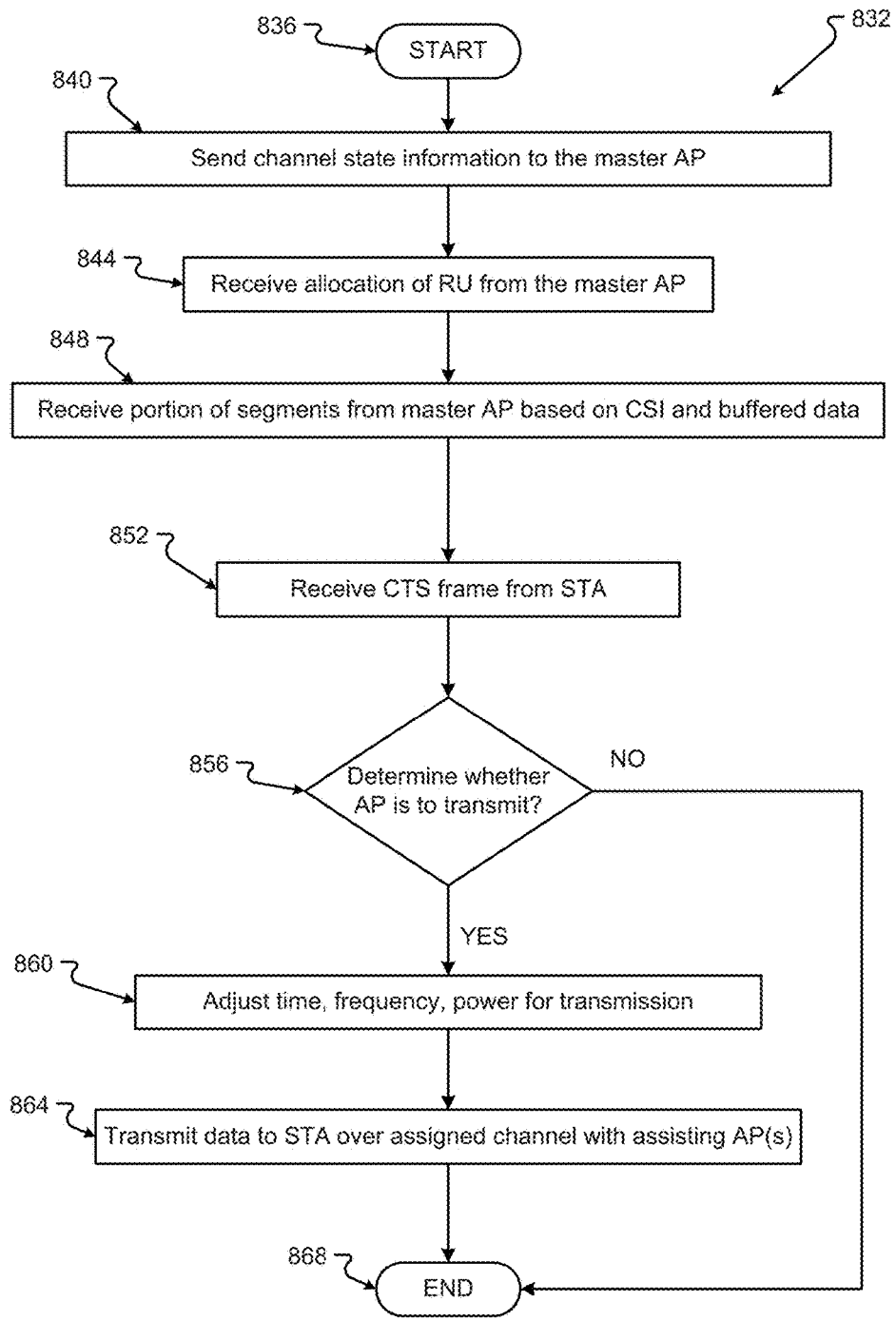
FIG. 8B is another flowchart outlining an exemplary technique for using a multiple access point channel bonding transmission technique.

The process 832 conducted by the assisting APs 102b-102d may be as shown in FIG. 8B. A general order for the steps of the method 832 is shown in FIG. 8B. Generally, the method 832 starts with a start operation 836 and ends with operation 868. The method 832 can include more or fewer steps or can arrange the order of the steps differently than those shown in FIG. 8B. The method 832 can be executed as a set of computer-executable instructions executed by a computer system or processor and encoded or stored on a computer readable medium. Hereinafter, the method 832 shall be explained with reference to the systems, components, circuits, modules, software, data structures, signalling processes, etc. described in conjunction with FIGS. 1-8A and 21.

Figure 9:
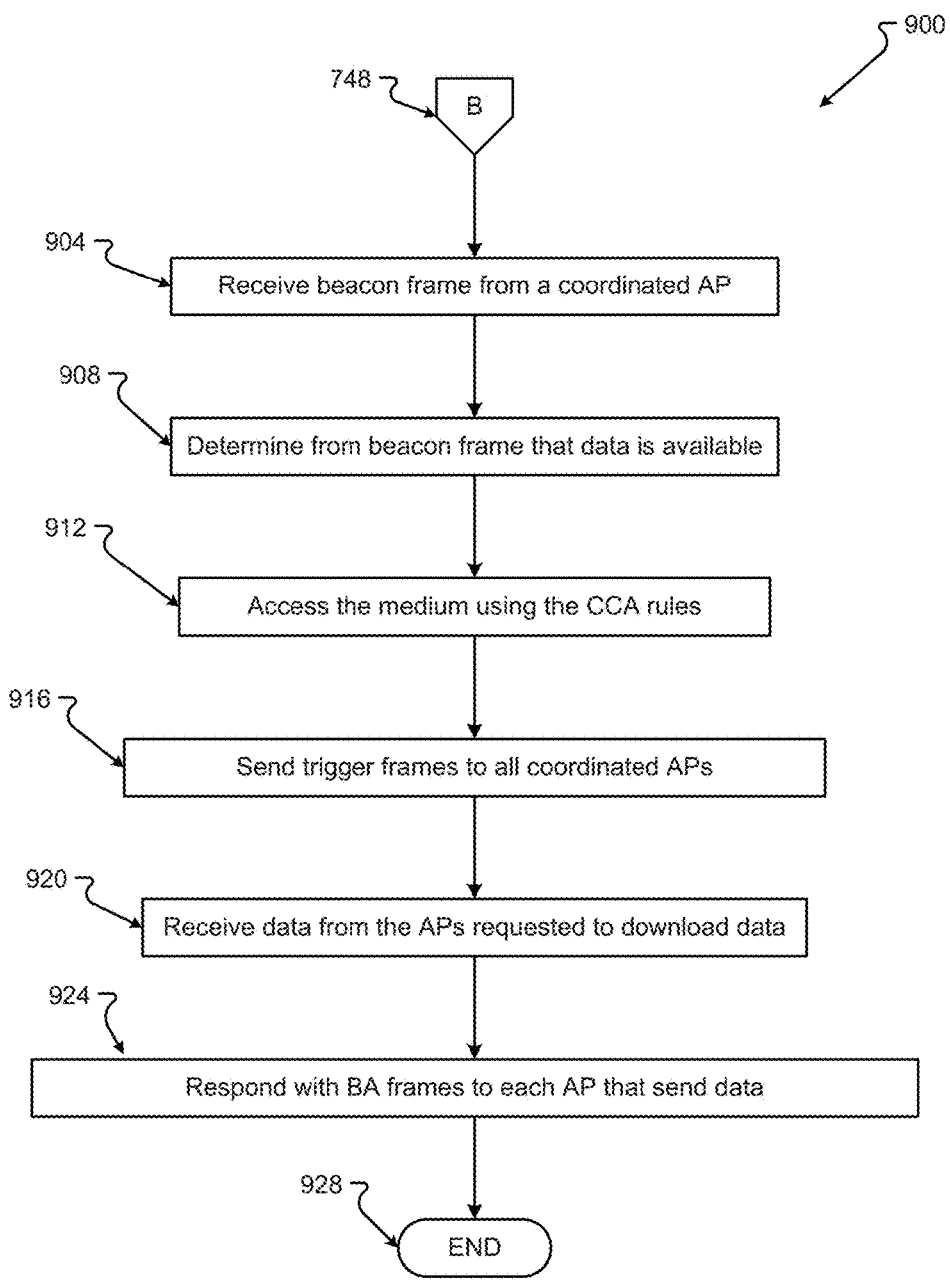
FIG. 9 is another flowchart outlining an exemplary technique for using a multiple access point channel coding transmission technique.

The process 900 conducted by the CE STA 104d may be as shown in FIG. 9. A general order for the steps of the method 900 is shown in FIG. 9. Generally, the method 900 starts with a start operation and ends with operation 928. The method 900 can include more or fewer steps or can arrange the order of the steps differently than those shown in FIG. 9. The method 900 can be executed as a set of computer-executable instructions executed by a computer system or processor and encoded or stored on a computer readable medium. Hereinafter, the method 900 shall be explained with reference to the systems, components, circuits, modules, software, data structures, signalling processes, etc. described in conjunction with FIGS. 1-8B and 21. The above methods 700, 832, 900 will be described in conjunction, hereinafter.

In step 708, one of the APs (AP 102a) is selected as the main or master AP (e.g. AP1). The other APs (e.g. AP2-AP4) 102b-102d are defined as assisting APs, in step 712, which can assist AP1 102a with requests.

The master AP 102a can collect channel state information (CSI) from/between all the coordinated APs 102a-102d and the STA 104d, in step 716 and 840, to allocate resource units (RU), in step 720 and 844, among all the coordinated APs 102a-102d for data transmissions to the CE STA (e.g. STA1) 104d using multi-AP channel bonding. Here, the master AP 102 only needs simplified CSI (e.g. signal to noise ratio) rather than full channel information such as that used in the Cooperative Multi-Point (CoMP) techniques.

When AP1 102a receives data packets, in step 724, for the CE STA 104d, which may be located in the center of the room, AP1 102a, STA1 104d, and all other APs 102b-102d can complete the steps explained hereinafter to enable multi-AP channel bonding (MACB) transmissions to provide a high physical data rate to STA1 104d.

First, AP1 102a may divide the data packets, in step 728, into several segments (portions of the data packet) and transmit the data packets, in step 732, 848, to different assisting APs 102b-102d based on the CSI and the amount of data buffered at the APs 102b-102d. For example, if the channel conditions from all the APs 102b-102d to the CE STA 104d and the buffered data at all the APs 102b-102d are almost same, then AP1 102a can keep the first segment of the data packet and transmit the 2nd, 3rd and 4th segment of the data packet to the other APs 102b-102d. Further, the AP1 102a can transmit, in step 736, 844, the RU allocation information to AP2 102b, AP3 102c, and AP4 102d, respectively, through a network connection (e.g. an Ethernet connection). In this example, AP1 102a instructs AP1 102a, AP2 102b, AP3 102c, and AP4 102d to use the 1st, 2nd, 3rd and 4th 20 MHz channel, respectively, as shown in FIG. 3B. Then, the master AP 102a can determine if the MACB data transmission is to be initiated by AP1 102a or STA1 104d, in step 740. If the master AP 102a is to initiate the MACB transmission, then the method 700 proceeds through off-page connector 744 to the method 800 shown in FIG. 8A. If the master CE STA 104d is to initiate the MACB transmission, then the method 700 proceeds through off-page connector 748 to the method 900 shown in FIG. 9.

In step 804, AP1 102a can follow the clear channel access (CCA) rules, as defined in the IEEE 802.11ac Standard, to access the medium. In this configuration, AP1 102a may sense, in step 808, that the total 80 MHz channel is idle and can initiate, in step 812, a MACB transmission by transmitting duplicate request to send (RTS) frames 404a-404d (shown in signalling scheme 400 in FIG. 4) on the 80 MHz channel to CE STA 104d.

Figure 5A:
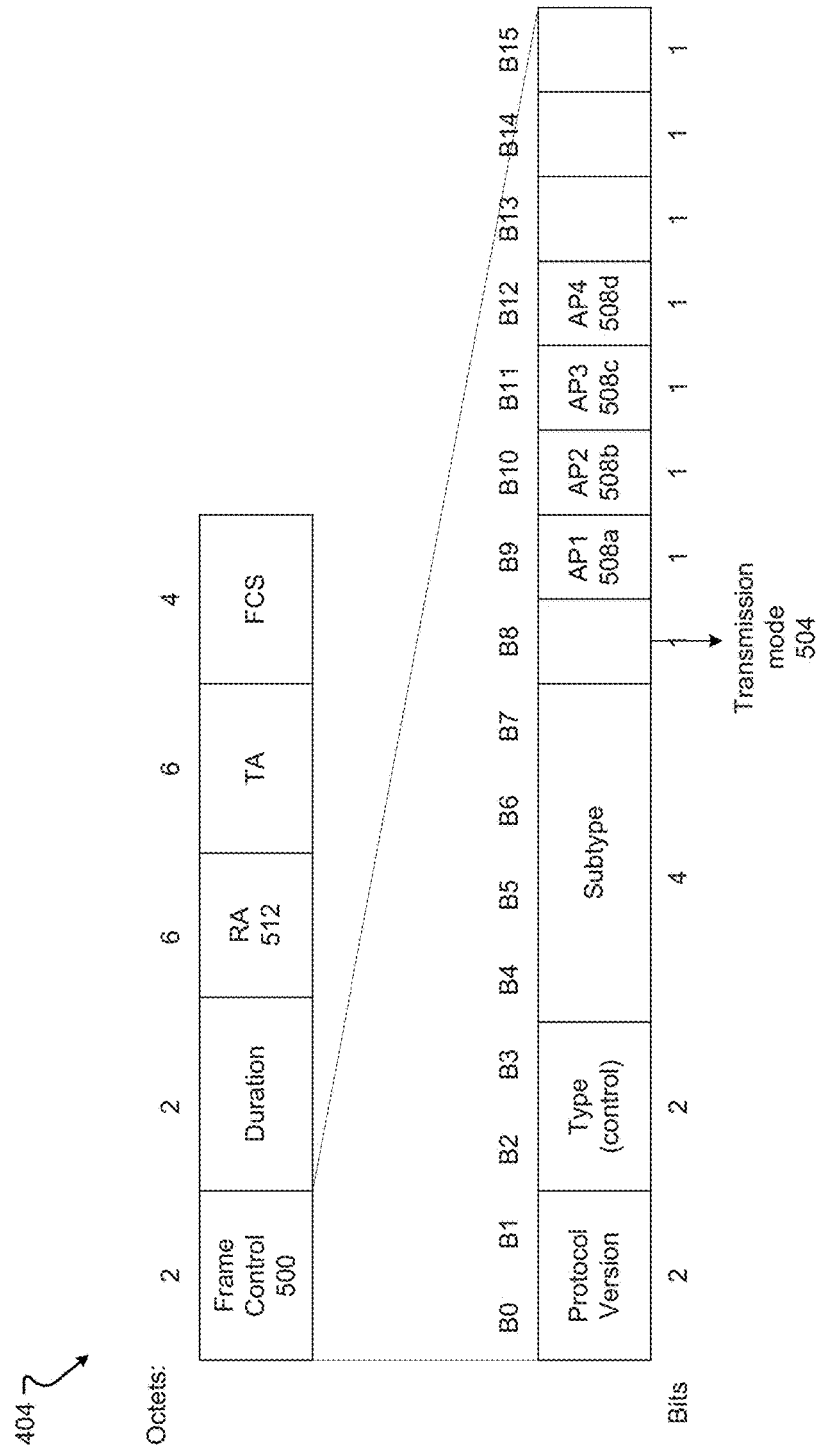
FIG. 5A illustrates an embodiment of a RTS frame sent to a CE STA from an AP.

The duplicate RTS frames 404, shown in FIG. 5A, may include new information in the frame control 500, indicating that the AP 102a is requesting the MACB transmission with the participating APs 102a-102d. The new information may be signalled with the reserved bits (bits B8-B12 504-508d) of the frame control field 500 of the RTS frame 404, as shown in FIG. 5A. The bit B8 504, in the frame control field 500, can be used to indicate whether the transmission mode is a single AP transmission (bit set to 0) or a multiple AP transmission (bit set to 1), as shown in Table 1 below. When B8 is set to 1, the bits B9-B12 508a-508d may be used to indicate whether the APi (i=1, 2, 3, 4) is requested to transmit data in the multiple-AP transmission mode (bit set to 1) or not (bit set to 0), as shown in Table 1 below:

TABLE 1

| Frame control field definitions of new RTS frame: | | | | |
| --- | --- | --- | --- | --- |
| B8 | B9 | B10 | B11 | B12 |
| Transmission mode indicator 0 = single AP 1 = multiple AP | AP1 is requested to transmit data 0 = no 1 = yes | AP2 is requested to transmit data 0 = no 1 = yes | AP3 is requested to transmit data 0 = no 1 = yes | AP4 is requested to transmit data 0 = no 1 = yes |

Figure 5B:
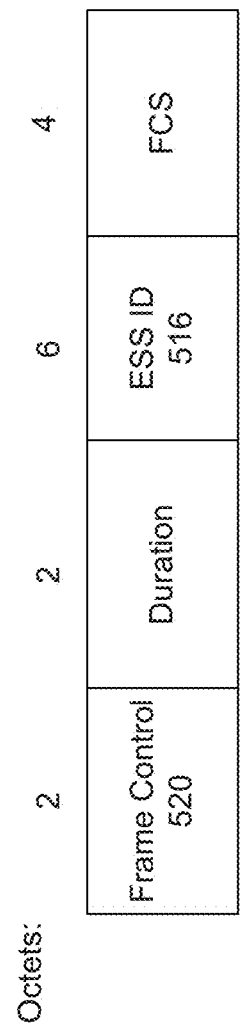
FIG. 5B illustrates an embodiment of a CTS frame sent from an AP to a CE STA.

Upon receiving duplicate RTS frames 404 from AP1 102a on the 80 MHz channel, CE STA 104d sends duplicate clear to send (CTS) frames 408a-408d to AP1 102a, AP2 102b, AP3 102c, and AP4 102d, over the four 20 MHz channels, which is indicated in the RTS frames 404. The Receiver Address (RA) field 512 of the CTS frame 404 is set as the ESS identifier 516, as shown in FIG. 5B. All the APs 102a-102d, in the ESS, can be the receiver of the RTS frame 404. CE STA 104d can copy the transmission mode indicator 504 and per AP information 508 in the frame control field 500 of RTS frame 404 to that of the frame control field 520 in the CTS frame 408.

Upon receiving the duplicate CTS frames 408a-408d from STA1, in step 816, 852, and based on the per AP information in the control field 520, the assisting APs (AP1-AP4) 102a-102d determine whether that AP 102 has been requested to transmitted data or not, in step 820, 856. If the AP 102 is requested to transmit a downlink (DL) data packet, the method 800, 832 proceeds YES to step 824 or step 860. If the AP 102 is not requested to transmit a downlink (DL) data packet, the method 800, 832 proceeds No to end operation 828 or end operation 868. In step 824 or step 860, the AP 102 can adjust time, frequency, and power, and then, the AP 102 can simultaneously transmit, in step 828, 864 the data packets to the CE STA 104d over the assigned channels.

Referring to FIG. 9, the CE STA 104d can receive a beacon frame from one of the coordination APs 102 (likely the master AP 102a). From information in the beacon frame, the CE STA 104d can determine, in step 908, that there are some data packets for CE STA 104d from one or more coordinated APs 102 through the beacon frame. In step 912, CE STA 104d follows the CCA rules to access the medium and transmits, in step 916, duplicated trigger frames to all the coordinated APs 102 that have data packets for the CE STA 104d.

The trigger frame, which also can contain similar information as that shown and described in conjunction with FIGS. 5A and 5B, may include the information indicating whether the AP 102 in the ESS are requested to transmit DL data packet with MACB transmission mode. The information may be signalled with a reserved bit 504 of the frame control field 500 of trigger frame, which may be as shown in Table 1 above.

Upon receiving the trigger frames from CE STA 104d, the coordinated APs 102a-102d, which have been requested to transmit downlink data packets for CE STA 104d, can do time, frequency and power adjustments, as in step 824, 860, and then transmit, in step 828, 868, the data packets 412a-412d to CE STA 104d over the assigned channels simultaneously.

After receiving, in step 920, data packets 412a-412d from AP1 to AP4 102a-102d using MACB transmission, CE STA 104d can respond, in step 924, with block acknowledgement (BA) frames 416a-416d, to each AP 102a-102d over the four 20 MHz channels, as shown in FIG. 2b. The duplicate BA frames 416 can indicate the acknowledgement information of all the data frames 412 the CE STA 104d received from AP1-AP4 102a-102d.

The improvement to the physical data for CE STA 104d may be as shown in the charts 604, 608, in FIGS. 6A and 6B. The improvement to the physical data rate by using the embodiments described herein, over the traditional one AP to one STA transmission, is evident. The embodiments described herein can increase the physical data rate dramatically when the STA is located in the middle of the room at the cell edge of the APs. For example, when the STA 104d is in the center of the room, it can achieve up to a 4 times better physical data rate.

Additional or alternative embodiments for increasing the performance of a cell-edge STA 104d are further described hereinafter with reference to FIGS. 10-20. In the following configurations, both the downlink (DL) and uplink (UL) performance of the CE STA 104d can be enhanced by using low-power radios (LPRs) 2156 to identify available channels and to increase opportunities to access the wireless medium. By using the LPRs 2156 to initiate the downlink data transmission, the CE STA 104d is able to switch among multiple non-contiguous channels to receive downlink data packets from multiple APs 102a-102c, instead of a single AP. Also, by using LPRs 2156 to identify the available channels among non-contiguous channels, the CE STA 104d is able to get higher channel access opportunities to transmit uplink data packets.

Figure 10:
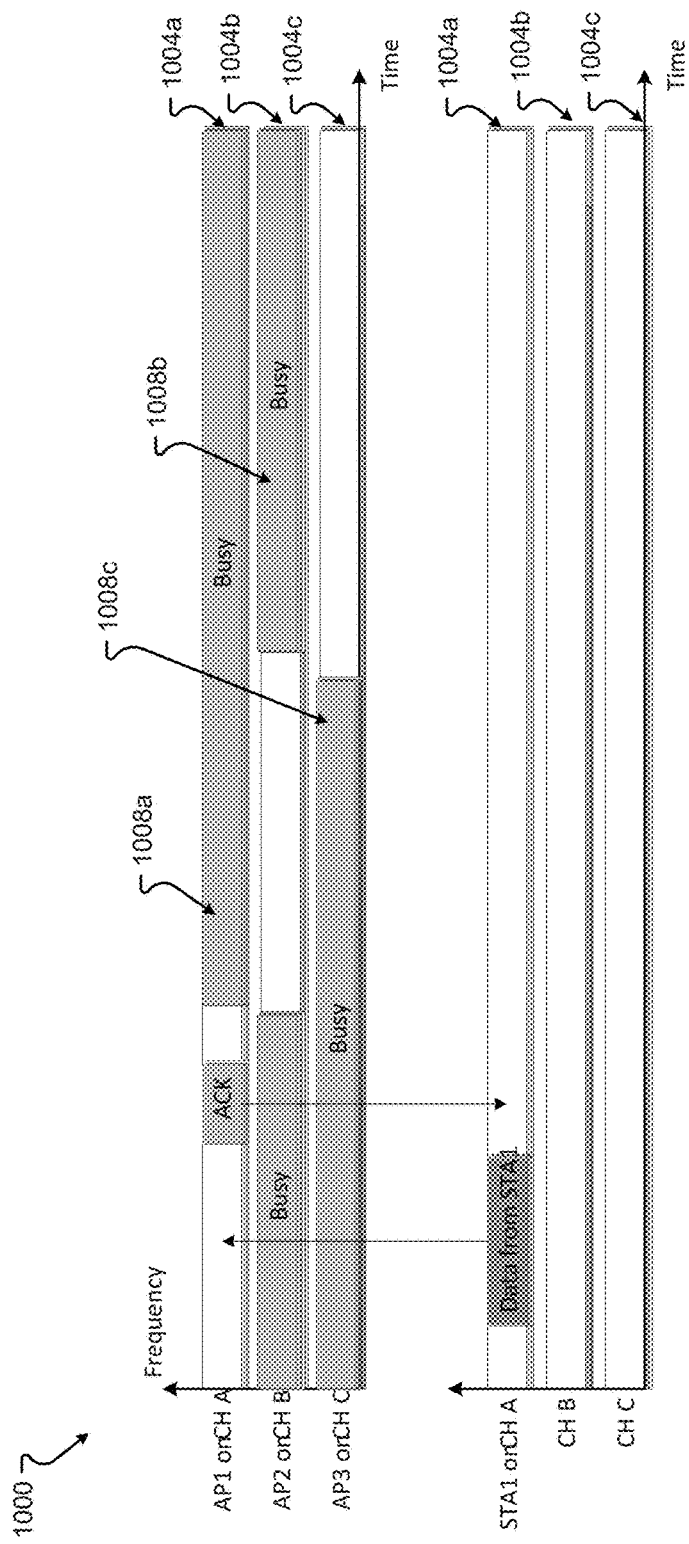
FIG. 10 is a signalling diagram for an embodiment of a communication session between a CE STA and one AP when there are two more APs in another BSS.

As shown in FIG. 2, there can be multiple APs 102 operating in the environment 200. CE STA 104d may have overlapping coverage of the three APs 102a-102c, as shown in FIG. 2. In the examples provided hereinafter, there can be three APs 102a-102c operating on three 20 MHz channels, CH A, CH B and CH C, respectively (there can be more or fewer APs 102 operating in the environment 200 as one skilled in the art would understand). Referring to FIG. 10, the three channels, CH A 1004a, CH B 1004b and CH C 1004c, can be contiguous or non-contiguous.

With current IEEE 802.11 communications, the CE STA 104d could only associate with one of the APs 102a-102c; for example, CE STA 104d may only associate with AP1 102a. As shown in FIG. 10, when CH A 1004a is busy during period 1008a (occupied by other STAs 104a-104c in BSS 100), CE STA 104d cannot access the medium for data transmission until CH A 1004a becomes idle.

If the CE STA 104d is associated with the three APs 102a-102c and has the capability to operate on three contiguous or non-contiguous channels, the CE STA 104d can access the medium for uplink data transmission as long as there is one available channel among the three channels, CH A 1004a, CH B 1004b and CH C 1004c.

Figure 11:
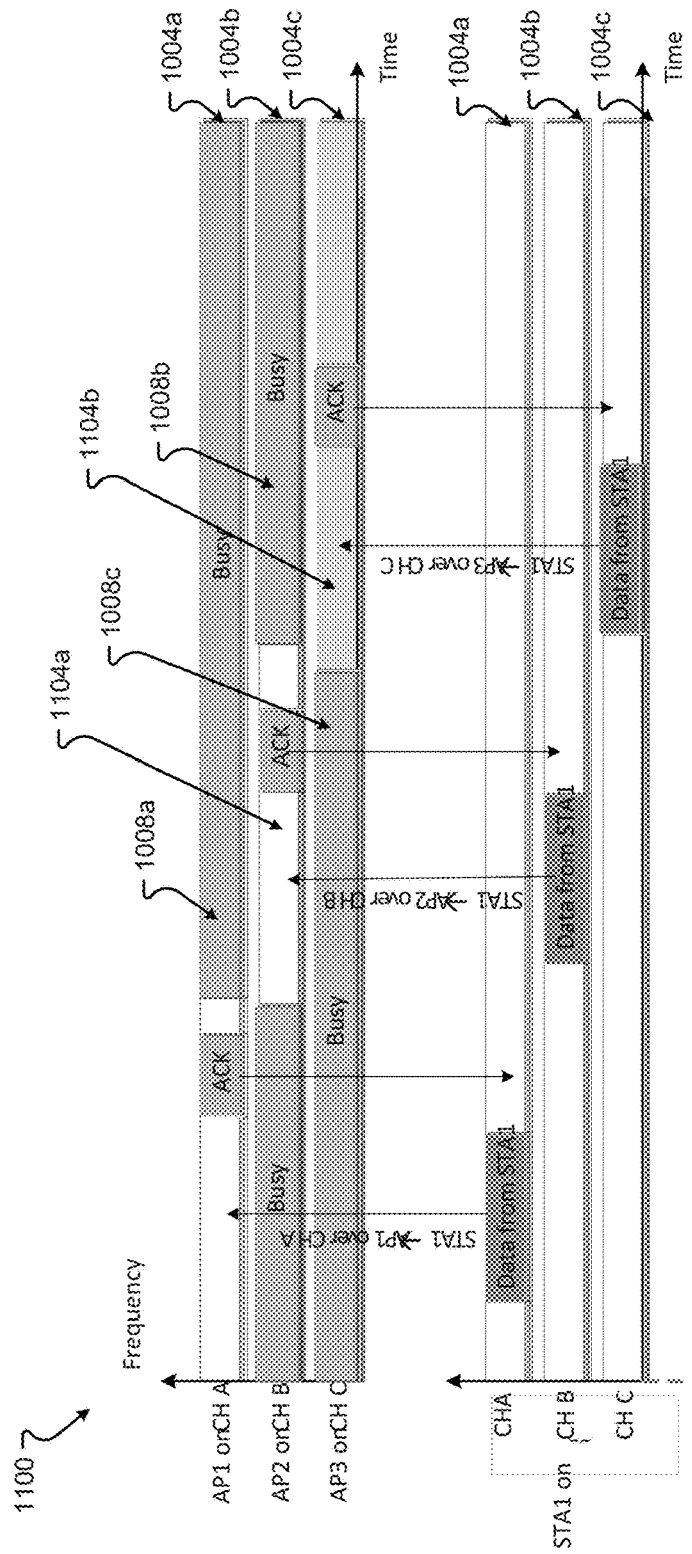
FIG. 11 is another signalling diagram for an embodiment of a communication session between a CE STA and two more APs.
Figure 12:
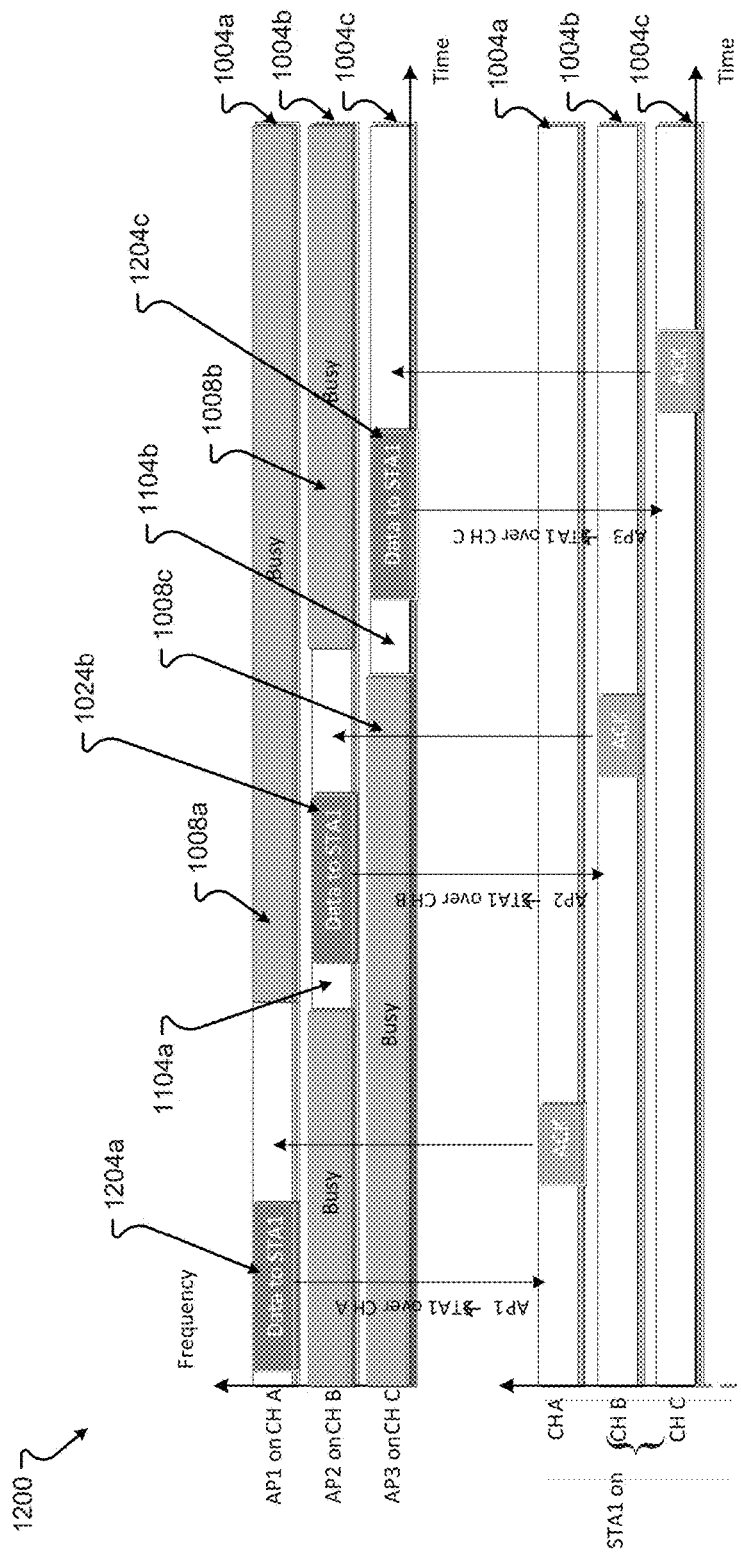
FIG. 12 is another signalling diagram for an embodiment of a communication session between a CE STA and three APs.

As shown in the signalling arrangement 1100 in FIG. 11, when the CH A 1004a is busy, at time 1008a, CH B 1004b or CH C 1004c may be idle, as at times 1104a and 1104b. When idle, the CE STA 104d can access the other available channels, such as CH B 1004b, at time 1104a, for data transmission. Further, as shown in the signalling diagram 1200 in FIG. 12, the CE STA 104d can also receive downlink data packets 1204a-1204c from the three APs 102a-102c over the available channels 1004a-1004c simultaneously or in series rather than from the single AP 102a over CH A 1004a.

The capability of operating on multiple channels can improve the performance of the CE STA 104d due to the higher channel access opportunities. When the three 20 MHz channels are contiguous, the signalling method can use the MACB methods described previously, and the CE STA 104d can operate on the three contiguous channels without extra cost in terms of power consumption. However, when the three channels are non-contiguous, which is more likely to happen in an unmanaged network, sending or receiving data becomes more expensive, in terms of power consumption, for the CE STA 104d to operate.

In the alternative or additional embodiments described hereinafter, CE STA 104d can include two or more low power receivers (LPRs) 2156, e.g. N=3, which enables the CE STA 104d to operate on multiple non-contiguous channels with much less power consumption. For example, the CE STA 104d can be associated with all of the three APs 102a-102c and have three LPRs 2156 operating on the three APs 102a-102c' channels, CH A 1004a, CH B 1004b and CH C 1004c, respectively. The following describes how to improve the downlink and uplink performance of the CE STA 104d by using the LPRs 2156.

Figure 17:
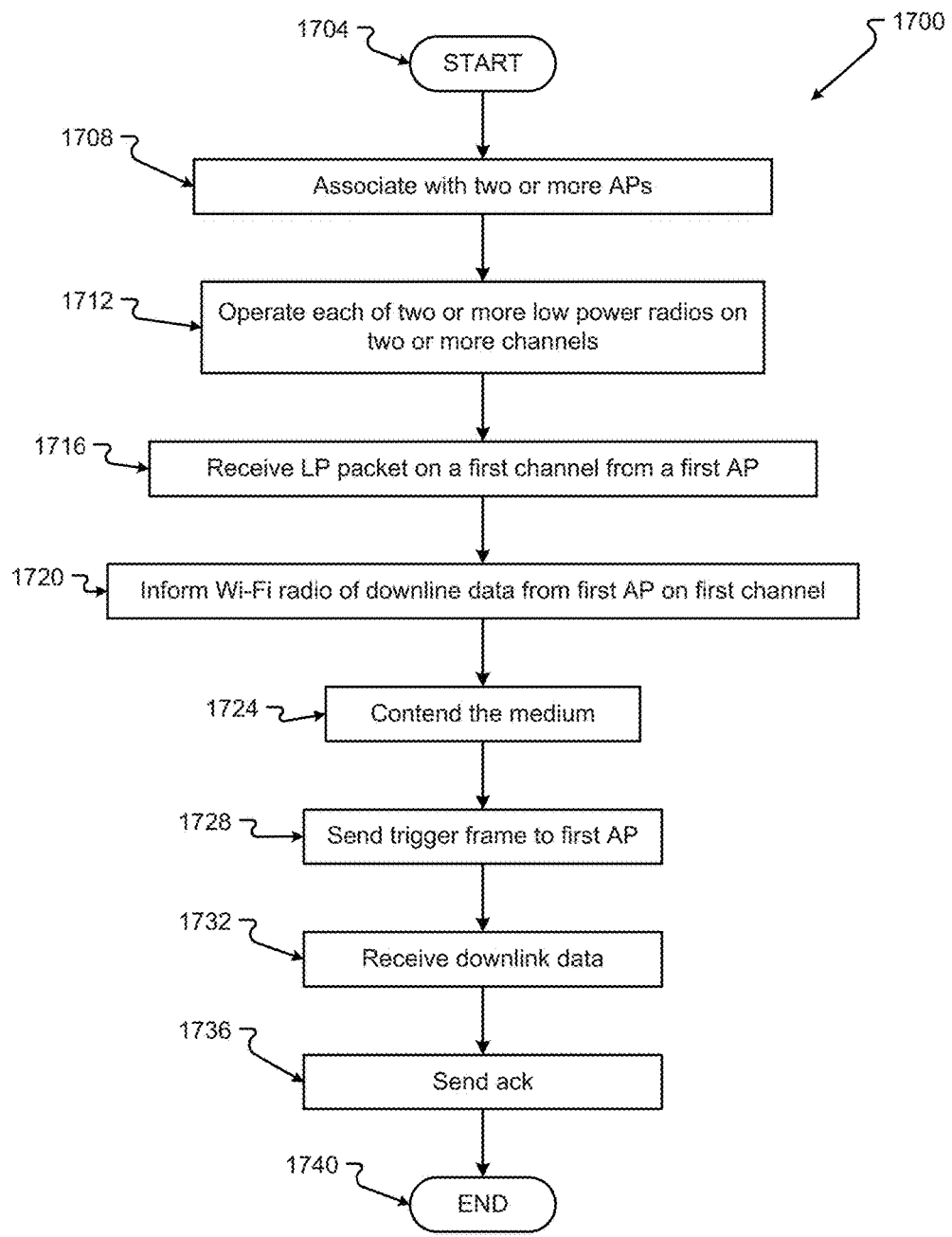
FIG. 17 is a flowchart outlining an exemplary technique for downloading data to a CE STA from the perspective of the CE STA.

Downlink Data Transmission:

The downlink processes will be described with reference to FIGS. 17 and 18. The process 1700, conducted by the CE STA 104d, may be as shown in FIG. 17. A general order for the steps of the method 1700 is shown in FIG. 17. Generally, the method 1700 starts with a start operation 1704 and ends with operation 1740. The method 1700 can include more or fewer steps or can arrange the order of the steps differently than those shown in FIG. 17. The method 1700 can be executed as a set of computer-executable instructions executed by a computer system or processor and encoded or stored on a computer readable medium. Hereinafter, the method 1700 shall be explained with reference to the systems, components, circuits, modules, software, data structures, signalling processes, etc. described in conjunction with FIGS. 1-16 and 21.

Figure 18:
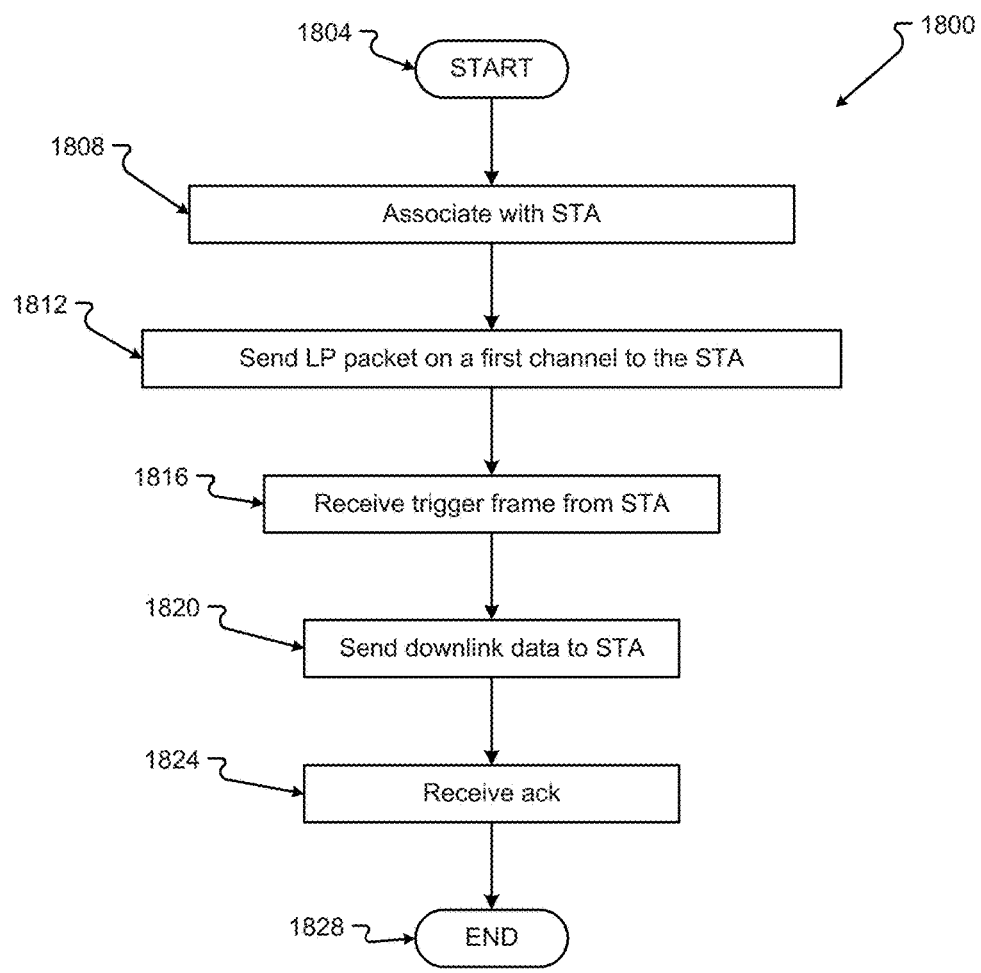
FIG. 18 is a flowchart outlining an exemplary technique for downloading data to a CE STA from the perspective of the AP.

The process 1800, conducted by the AP(s) 102a-102c, may be as shown in FIG. 18. A general order for the steps of the method 1800 is shown in FIG. 18. Generally, the method 1800 starts with a start operation 1804 and ends with operation 1828. The method 1800 can include more or fewer steps or can arrange the order of the steps differently than those shown in FIG. 18. The method 1800 can be executed as a set of computer-executable instructions executed by a computer system or processor and encoded or stored on a computer readable medium. Hereinafter, the method 1800 shall be explained with reference to the systems, components, circuits, modules, software, data structures, signalling processes, etc. described in conjunction with FIGS. 1-17 and 21.

First, the CE STA 104d associates with the APs 102a-102c, in step 1708, 1808. Association may be as understood in the art. When one of the associated APs 102a-102c, for example, AP1 102a, has a downlink data packet for the CE STA 104d, AP1 102a and the CE STA 104d can do following procedures to enable downlink transmission, as shown in FIGS. 13a, 14a, 15a, and 16.

The LPR 2156 of AP1 102a can send, in step 1812, a low power (LP) packet 1304 using the low-power wakeup packet format, as defined in U.S. application Ser. No. 14/279,820, entitled "Method, System And Apparatus For Providing Coexistence Between Low Power Stations And Non-Low Power Stations," filed on May 16, 2014 which is incorporated herein by reference for all that it teaches and for all purposes. The LP packet 1304 may be sent to the CE STA 104d over CH A 1004a. The LP packet 1304 may include new information indicating that AP1 102a has a downlink data to transmit to the CE STA 104d The CE STA 104d can receive the LP packet 1304, in step 1716. Upon reception of the LP packet 1304 from AP1 102a over CH A 1004a, LPR1 2156a, in CE STA 104d, may inform, in step 1720, the Wi-Fi radio 2170 that there is downlink data packet for CE STA 104d from AP1 102a on CH A 1004a.

Figure 13A:
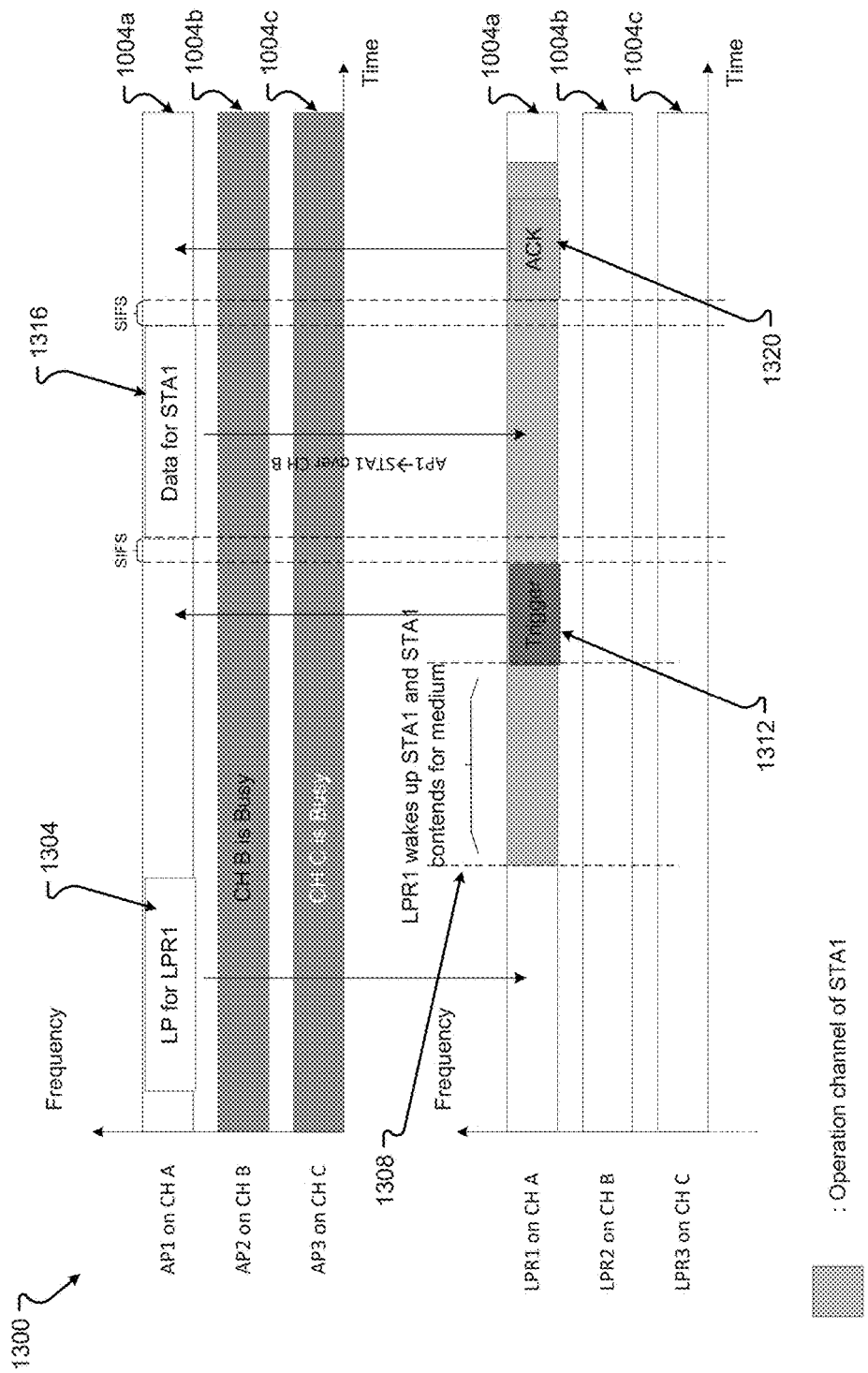
FIG. 13A is another signalling diagram for an embodiment of a communication session between a CE STA with three Low power receivers (LPRs) and three Aps.

CE STA 104d can do one or more of the following procedures, based on the status of the CE STA 104d. In a first situation 1300, as shown in FIG. 13a, if the Wi-Fi radio 2170 of the CE STA 104d is off, the CE STA 104d will turn on the Wi-Fi radio 2170, contend the medium, in step 1724 (during wake-up period 1308). The CE STA 104d can then transmit, in step 1728, a trigger frame 1312, over CH A 1004a, to AP1 102a. Here LPR 2156a is operated as low power wake up radio (LP WUR).

Figure 14A:
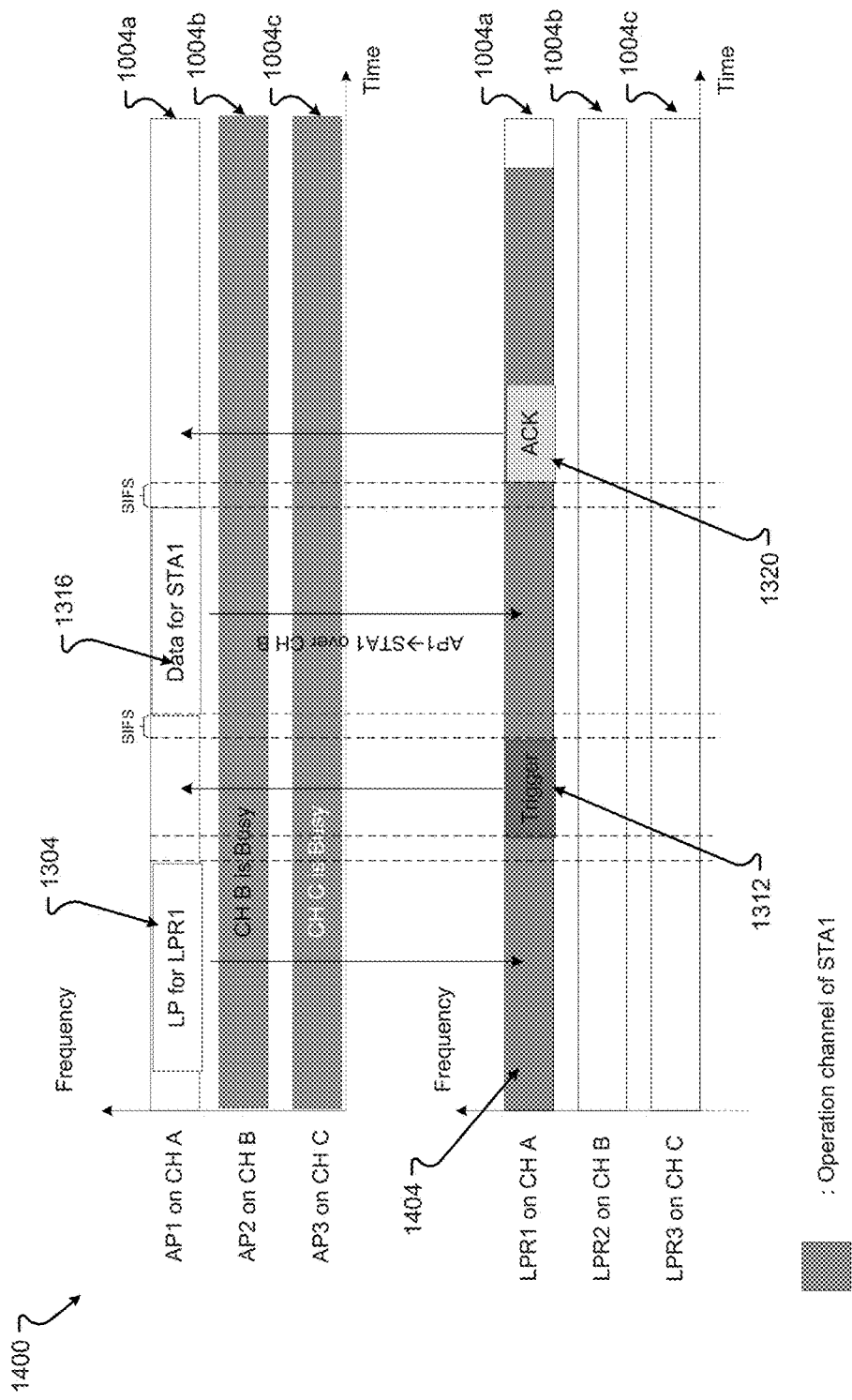
FIG. 14A is another signalling diagram for an embodiment of a communication session between a CE STA with three LPRs and three Aps

In a second situation 1400, as shown in FIG. 14a, if the Wi-Fi radio 2170 of the CE STA 104d is operating on CH A 1004a, in period 1404, and is free (i.e., the CE STA 104d is not transmitting or receiving packets currently), the CE STA 104d transmits, in step 1728, a trigger frame 1312 over CH A 1004a to AP1 102a a short time after LPR 1 2156a receives the LP signal 1304.

Figure 15A:
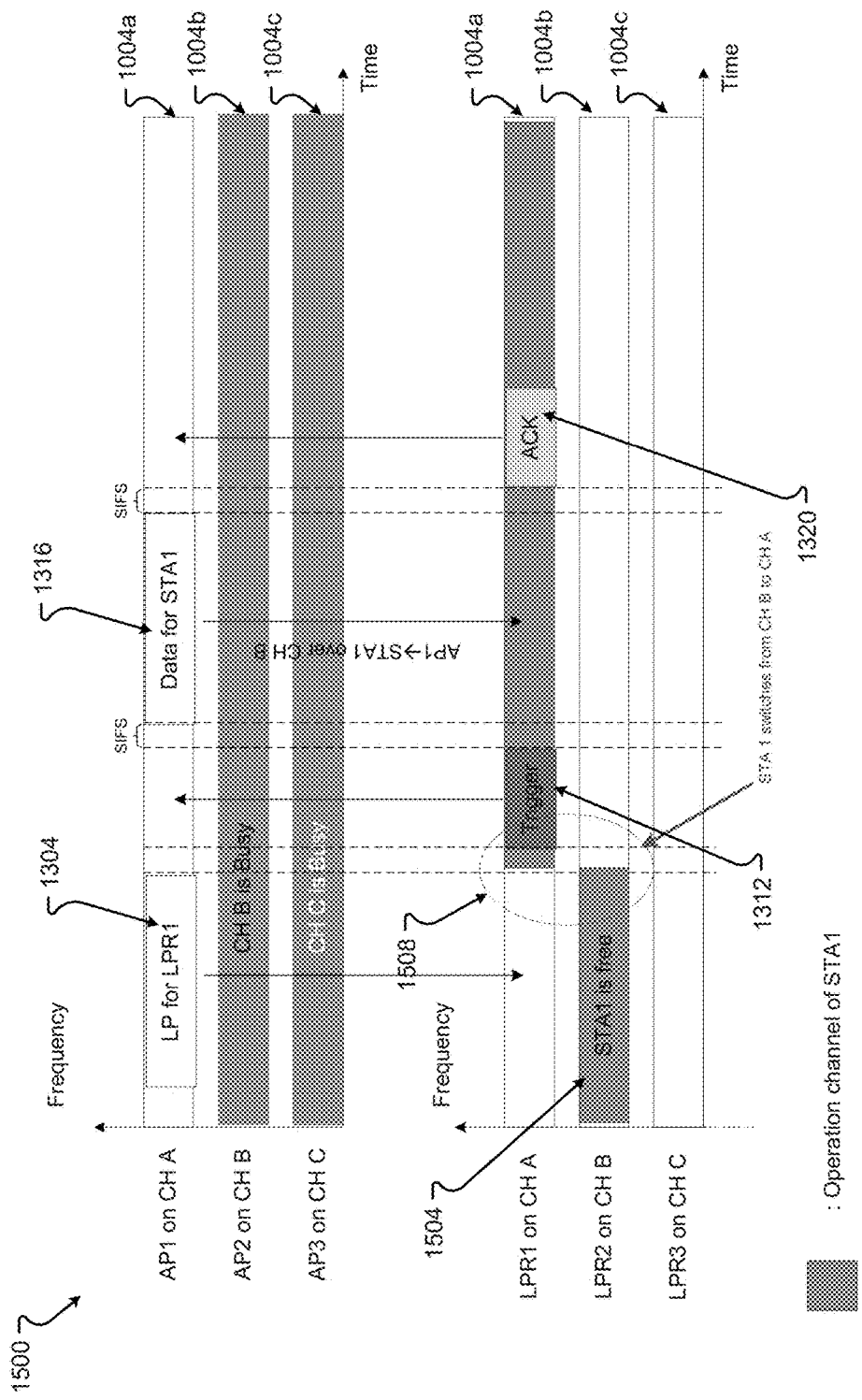
FIG. 15A is another signalling diagram for an embodiment of a communication session between a CE STA with three LPRs and three APs.

In a third situation 1500, as shown in FIG. 15a, if the Wi-Fi radio 2170 of the CE STA 104d is operating on another channel (as in time period 1504), such as CH B 1004b, and CH B 1004b is occupied by another STAs 104a-104c in BSS 100, the CE STA 104d switches, during event 1508, to CH A 1004a and transmits, in step 1728, a trigger frame 1312 over CH A 1004a to AP1 102a a short time after LPR 1 2156a receives the LP signal 1304.

In a fourth situation 1600, as shown in FIG. 16a, if the Wi-Fi radio 2170 of the CE STA 104d is operating on another channel, during period 1604, such as CH C 1004c, and is busy (i.e., the CE STA 104d is transmitting or receiving packets to or from AP3 102c over CH C 1004c), the CE STA 104d will switch, during event 1608, to CH A 1004a, after the data transmission with AP3 102c. Then, the Wi-Fi radio 2170 of the CE STA 104d can contend the medium, in step 1724, for the transmission of the trigger frame 1312, in step 1728, to AP1 102a over CH A 1004a.

In any of the above situations 1300-1600, after receiving the trigger frame 1312 from the CE STA 104d (and in response thereto), in step 1816, the AP1 102a transmits, in step 1820, the downlink data packet 1316 for CE STA 104d over CH A 1004a. The Wi-Fi radio 2170 of the CE STA 104d can receive the downlink data packet 1316, in step 1732.

Upon reception of the data frame 1316 from AP1 102a, the CE STA 104d can respond with an acknowledgement (ACK) frame 1320, to acknowledge the DL packet reception, in step 1736. AP1 102a can receive the ACK frame 1320 in step 1824.

If the CE STA 104d has an uplink data packet to transmit, the CE STA 104d may respond with an aggregated ACK/data frame 1320 to acknowledge the DL packet reception and to send an uplink data packet to the AP 102a. Then, the AP 102a can respond with a second ACK frame (not shown) to acknowledge the UL packet reception. This additional step can increase the uplink throughput of the CE STA 104d.

Figure 19:
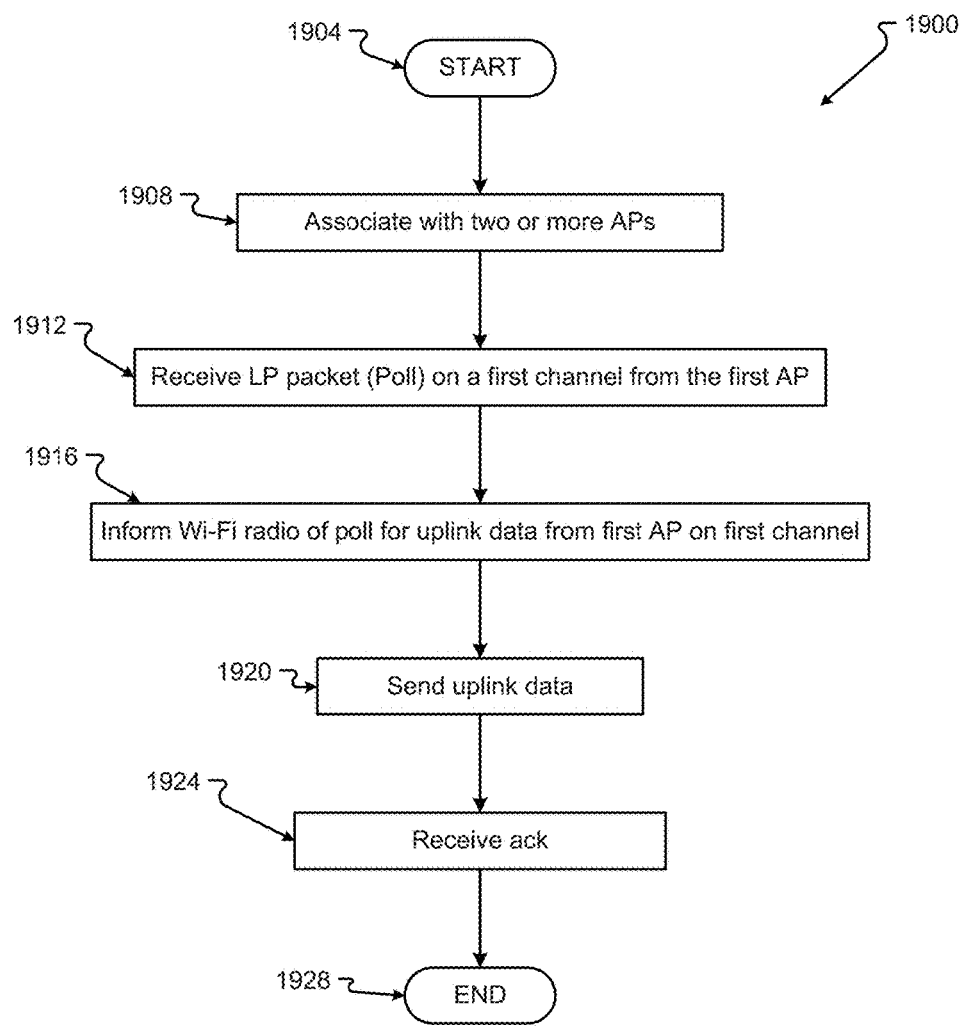
FIG. 19 is a flowchart outlining an exemplary technique for uploading data from a CE STA from the perspective of the CE STA.

Uplink Data Transmission:

The uplink processes will be described with reference to FIGS. 19 and 20. The process 1900, conducted by the CE STA 104d, may be as shown in FIG. 19. A general order for the steps of the method 1900 is shown in FIG. 19. Generally, the method 1900 starts with a start operation 1904 and ends with operation 1932. The method 1900 can include more or fewer steps or can arrange the order of the steps differently than those shown in FIG. 19. The method 1900 can be executed as a set of computer-executable instructions executed by a computer system or processor and encoded or stored on a computer readable medium. Hereinafter, the method 1900 shall be explained with reference to the systems, components, circuits, modules, software, data structures, signalling processes, etc. described in conjunction with FIGS. 1-18 and 21.

Figure 20:
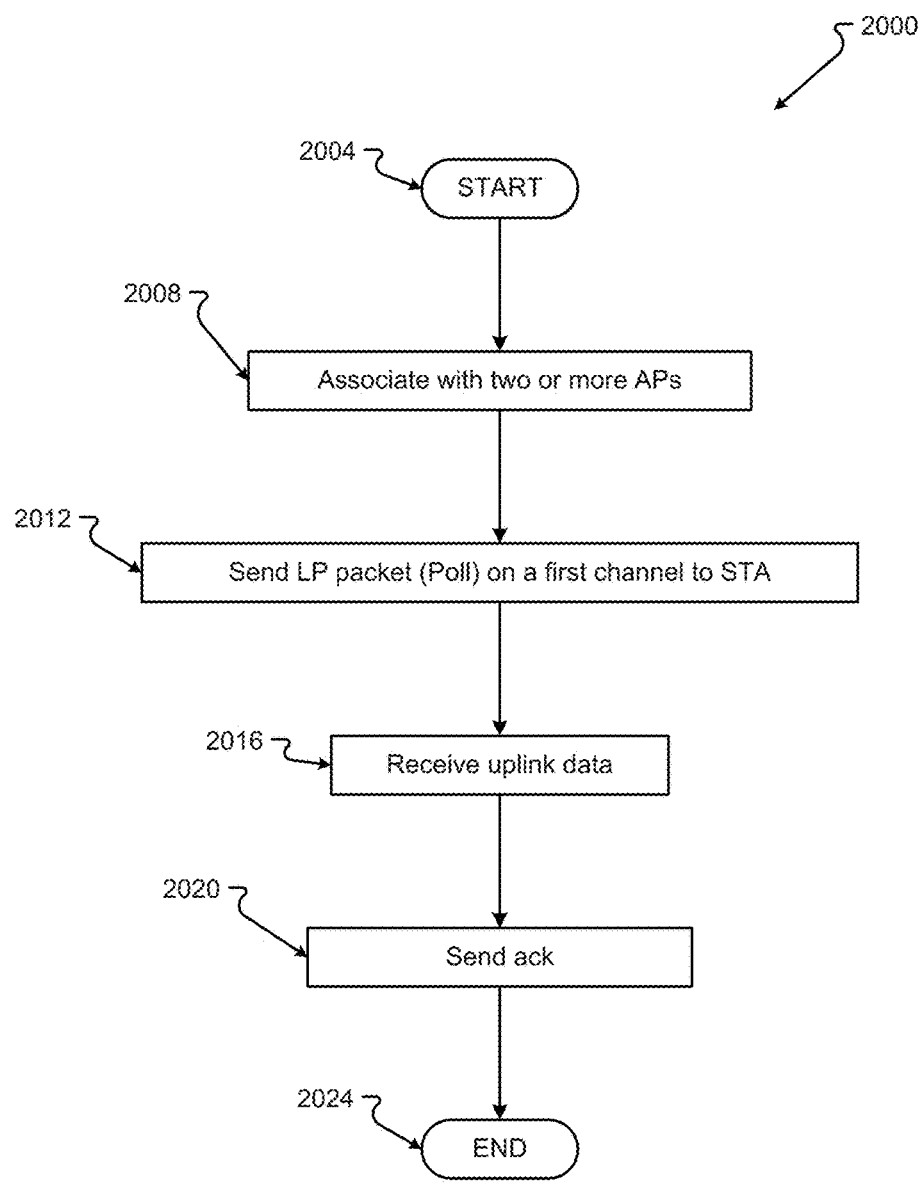
FIG. 20 is a flowchart outlining an exemplary technique for uploading data from a CE STA from the perspective of the AP.

The process 2000, conducted by the AP(s) 102a-102c, may be as shown in FIG. 20. A general order for the steps of the method 2000 is shown in FIG. 20. Generally, the method 2000 starts with a start operation 2004 and ends with operation 2024. The method 2000 can include more or fewer steps or can arrange the order of the steps differently than those shown in FIG. 20. The method 2000 can be executed as a set of computer-executable instructions executed by a computer system or processor and encoded or stored on a computer readable medium. Hereinafter, the method 2000 shall be explained with reference to the systems, components, circuits, modules, software, data structures, signalling processes, etc. described in conjunction with FIGS. 1-19 and 21.

Figure 13B:
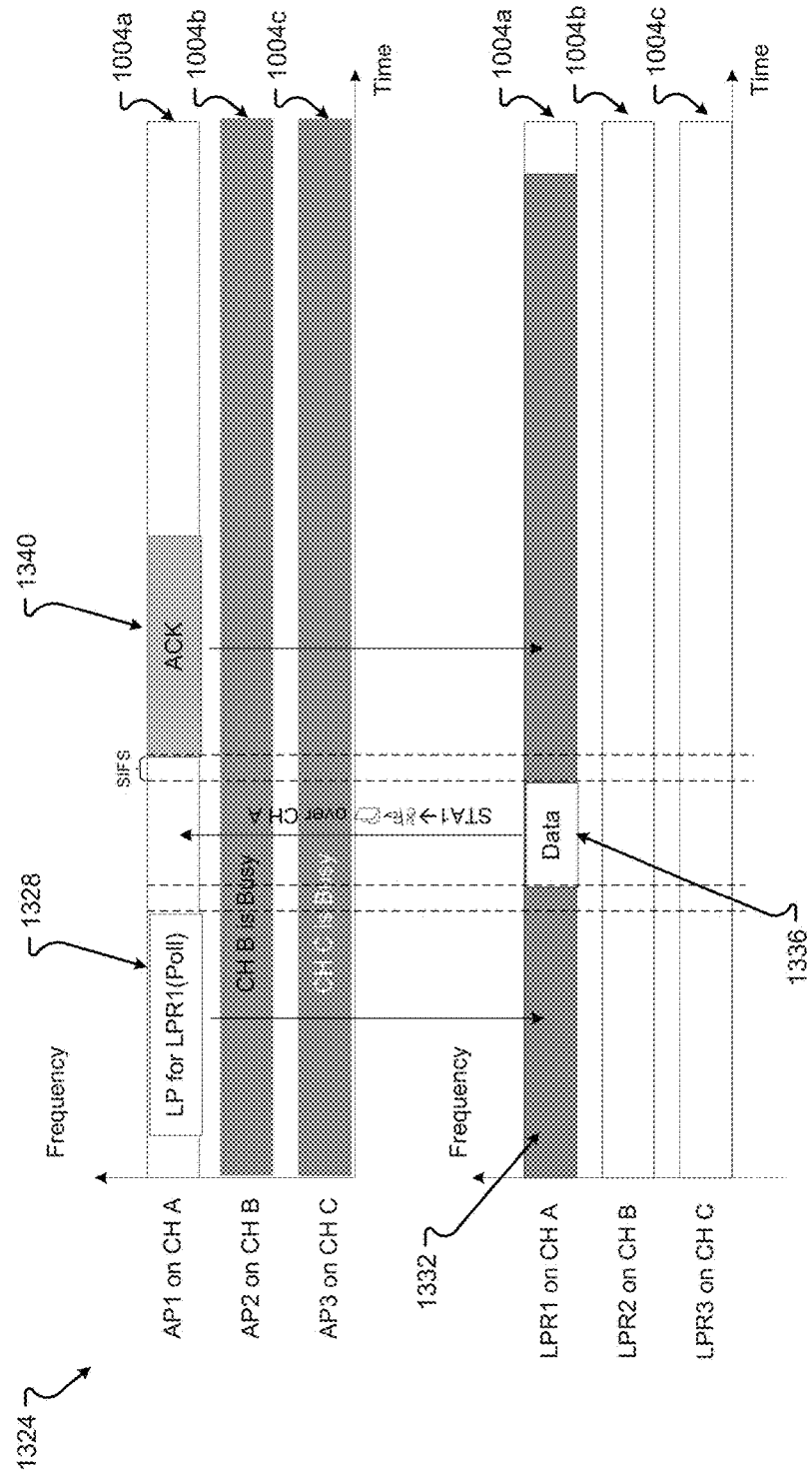
FIG. 13B is another signalling diagram for an embodiment of a communication session between a CE STA with three LPRs and three Aps
Figure 14B:
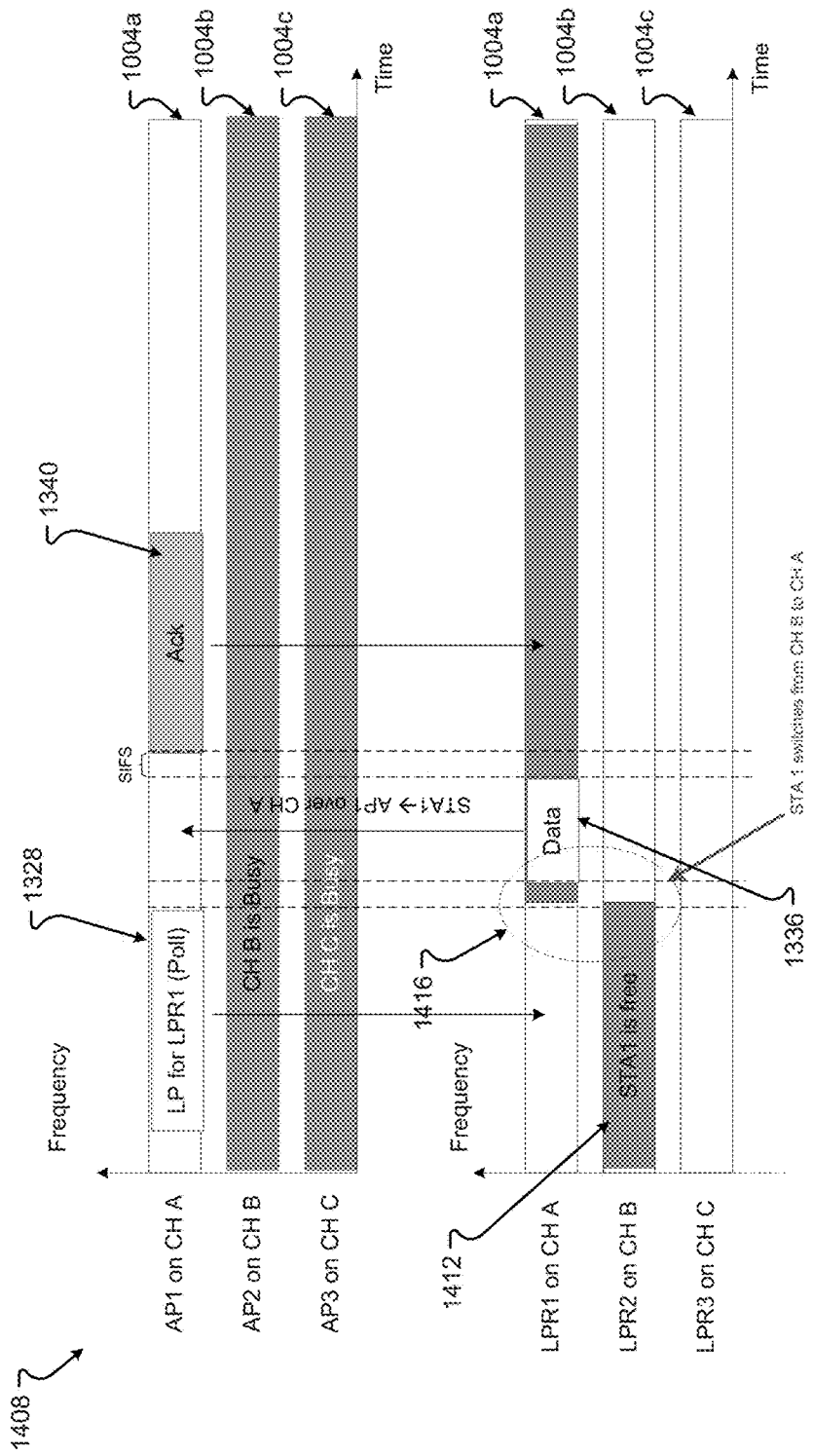
FIG. 14B is another signalling diagram for an embodiment of a communication session between a CE STA with three LPRs and three APs.
Figure 15B:
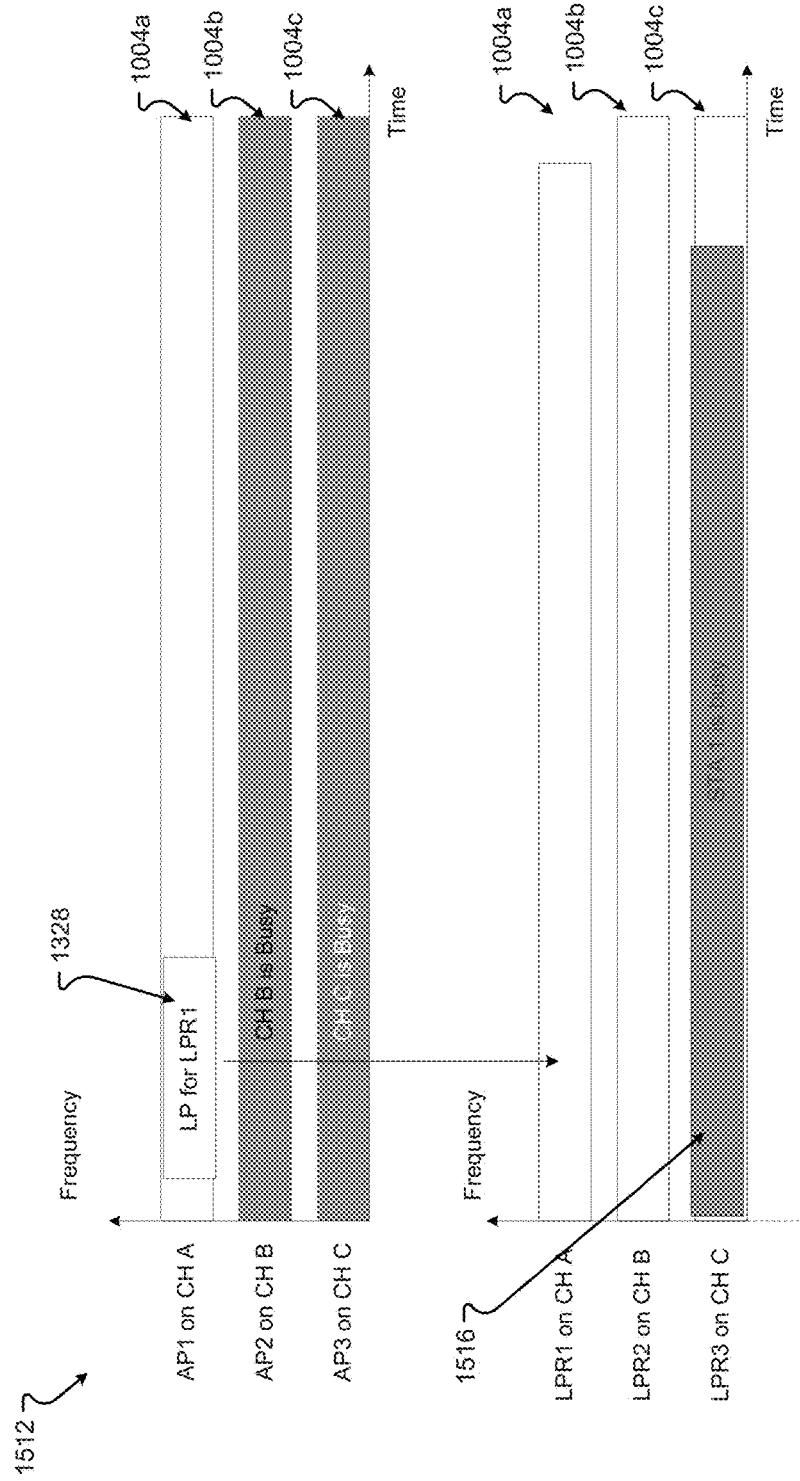
FIG. 15B is another signalling diagram for an embodiment of a communication session between a CE STA with three LPRs and three APs.
Figure 16:
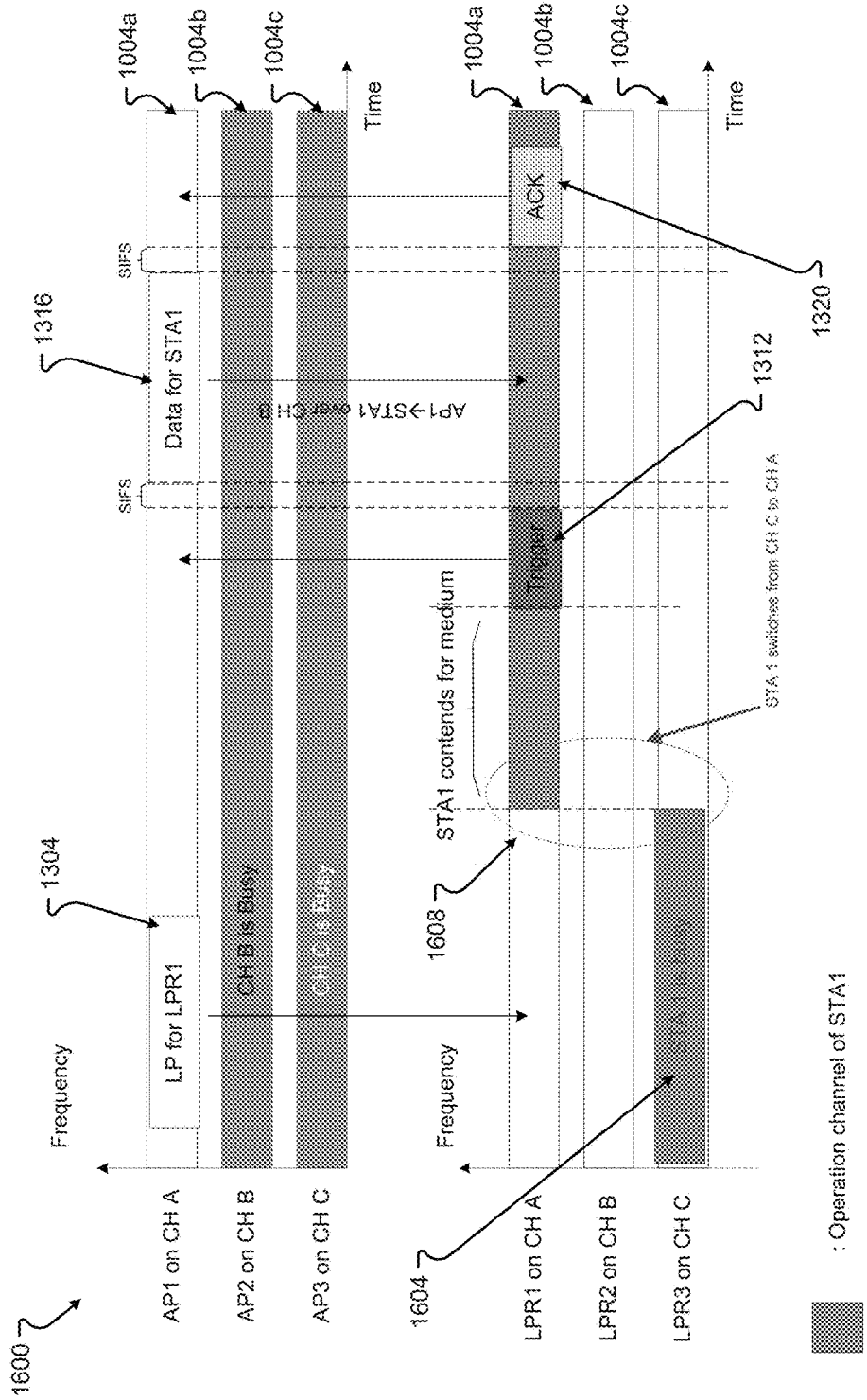
FIG. 16 is another signalling diagram for an embodiment of a communication session between a CE STA with three LPRs and three APs.

First, the CE STA 104d associate with the APs 102a-102c, in step 1908, 2008. Association may be as understood in the art. When the CE STA 104d is in active mode and has an uplink data packet to transmit, APs 102a-102c and the CE STA 104d can do following procedures to enable uplink transmission, as shown in FIGS. 13b, 14b, and 15b.

AP1 102a can send, in step 2012, a low power (LP) packet 1328, including new information that indicates AP1 102a is polling for uplink transmission. The LP packet 1328 may be using the low-power wakeup packet format, as defined in U.S. application Ser. No. 14/279,820, entitled "Method, System And Apparatus For Providing Coexistence Between Low Power Stations And Non-Low Power Stations," filed on May 16, 2014 which is incorporated herein by reference for all that it teaches and for all purposes. The LP packet 1328 may be sent to the CE STA 104d over CH A 1004a.

The CE STA 104d can receive the LP packet 1328, in step 1912. Upon reception of the LP packet 1328 from AP1 102a over CH A 1004a, LPR1 2156a, in CE STA 104d, may inform, in step 1916, the Wi-Fi radio 2170 that AP1 102a is polling for an uplink data transmission on CH A 1004a.

The CE STA 104d can do one or more of the following procedures, based on the status of the CE STA 104d. In a first situation 1324, as shown in FIG. 13b, if the Wi-Fi radio 2170 of the CE STA 104d is operating on CH A 1004a, in period 1332, and is free (i.e., the CE STA 104d is not transmitting or receiving packets currently), the CE STA 104d transmits, in step 1928, the uplink data 1336 over CH A 1004a to AP1 102a a short time after LPR 1 2156a receives the LP signal 1328.

In a second situation 1408, as shown in FIG. 14b, if the Wi-Fi radio 2170 of the CE STA 104d is operating on another channel (as in time period 1412), such as CH B 1004b, and CH B 1004b is occupied by another STA 104a-104c in the BSS 100, the CE STA 104d switches, during event 1416, to CH A 1004a and transmits, in step 1920, the uplink data 1336 over CH A 1004a to AP1 102a a short time after LPR 1 2156a receives the LP signal 1328.

In a third situation 1512, as shown in FIG. 15b, if the Wi-Fi radio 2170 of the CE STA 104d is operating on another channel, during period 1516, such as CH C 1004c, and is busy (i.e., the CE STA 104d is transmitting or receiving packets to or from AP3 102c over CH C 1004c), the CE STA 104d may not do anything.

In any of the above situations 1324, 1408, or 1512 (it should be noted that the STA may not do anything in situation 1512), the AP 102a can receive the uplink data, in step 2016. After receiving the data 1336, from the CE STA 104d (and in response thereto), in step 2016, the AP1 102a can transmit, in step 2020, an acknowledgement (ACK) frame 1340, to acknowledge the UL packet reception, in step 2016. The CE STA 104d 102a can receive the ACK frame 1340 in step 1924.

Figure 21:
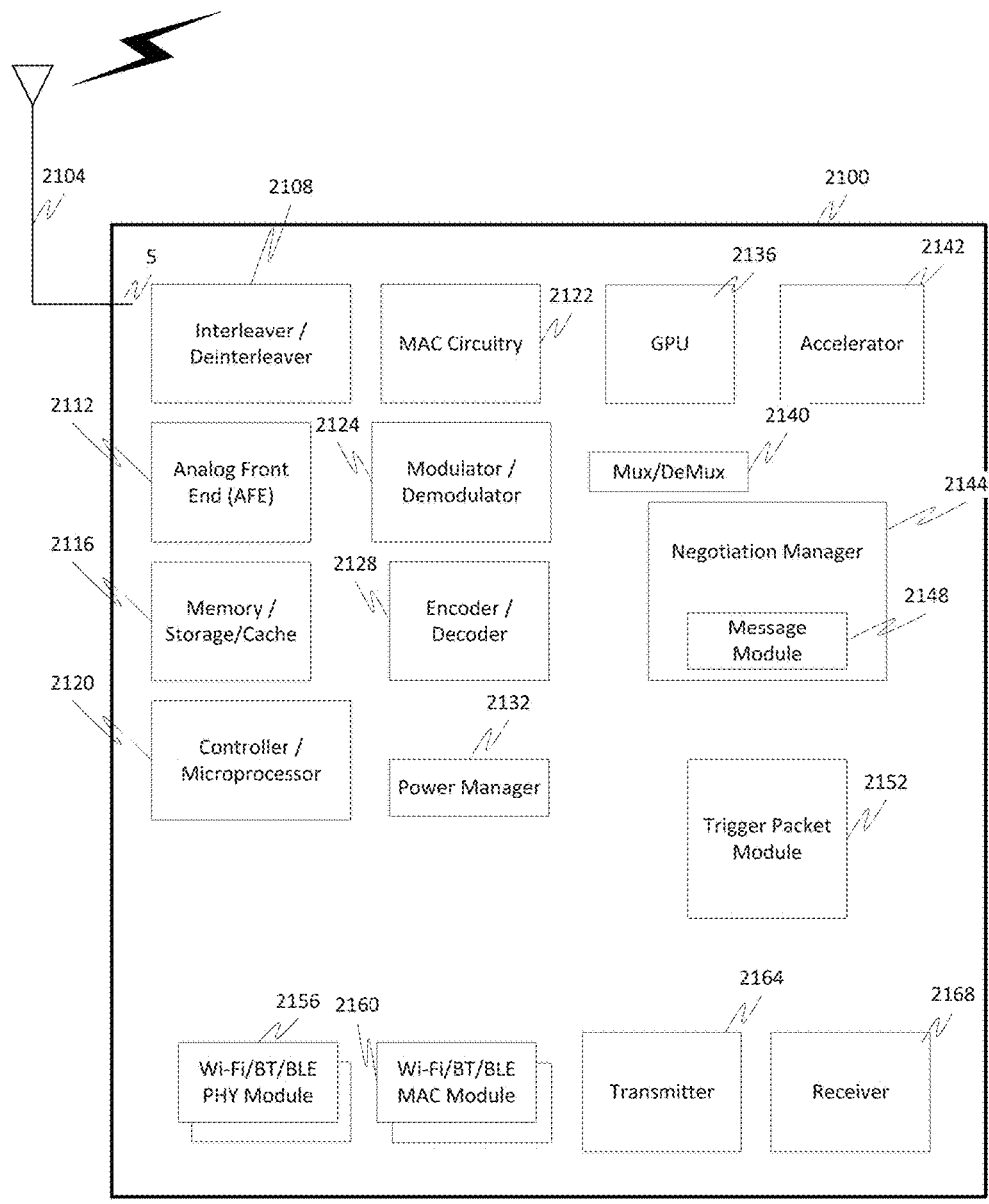
FIG. 21 is an illustration of the hardware/software associated with a CE STA and/or AP.

FIG. 21 illustrates an exemplary hardware diagram of a device 2100, such as AP 102 and/or STAs 104, or the like, that is adapted to implement the technique(s) discussed herein.

In addition to well-known componentry (which has been omitted for clarity), the device 2100 includes interconnected elements including one or more of: one or more antennas 2104, an interleaver/deinterleaver 2108, an analog front end (AFE) 2112, memory/storage/cache 2116, controller/microprocessor 2120, MAC circuitry 2132, modulator 2124, demodulator 2128, encoder/decoder 2136, GPU 2140, accelerator 2148, a multiplexer/demultiplexer 2144, LP-WUR controller 2152, LPRs (and LP-WUR) 2156a-2156c, packet assembler 2160, wake-up pulse allocator 2164, envelope detector 2168 and RF component(s) components such as a Wi-Fi PHY module/circuit 2180, a Wi-Fi/BT MAC module/circuit 2184, transmitter 2188 and receiver 2192. The various elements in the device 2100 are connected by one or more links/connections (not shown, again for sake of clarity).

The device 2100 can have one more antennas 2104, for use in wireless communications such as Wi-Fi, multi-input multi-output (MIMO) communications, multi-user multi-input multi-output (MU-MIMO) communications Bluetooth®, LTE, 5G, 60 Ghz, WiGig, mmWave systems, etc. The antenna(s) 2104 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 2104 generally interact with the Analog Front End (AFE) 2112, which is needed to enable the correct processing of the received modulated signal and signal conditioning for a transmitted signal. The AFE 2112 can be functionally located between the antenna and a digital baseband system to convert the analog signal into a digital signal for processing, and vice-versa.

The device 2100 can also include a controller/microprocessor 2120 and a memory/storage/cache 2116. The device 2100 can interact with the memory/storage/cache 2116 which may store information and operations necessary for configuring and transmitting or receiving the information described herein. The memory/storage/cache 2116 may also be used in connection with the execution of application programming or instructions by the controller/microprocessor 2120, and for temporary or long term storage of program instructions and/or data. As examples, the memory/storage/cache 2120 may comprise a computer-readable device, RAM, ROM, DRAM, SDRAM, and/or other storage device(s) and media.

The controller/microprocessor 2120 may comprise a general purpose programmable processor or controller for executing application programming or instructions related to the device 2100. Furthermore, the controller/microprocessor 2120 can cooperate with one or more other elements in the device 2100 to perform operations for configuring and transmitting information as described herein. The controller/microprocessor 2120 may include multiple processor cores, and/or implement multiple virtual processors. Optionally, the controller/microprocessor 2120 may include multiple physical processors. By way of example, the controller/microprocessor 2120 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 2100 can further include a transmitter 2188 and receiver 2192 which can transmit and receive signals, respectively, to and from other wireless devices and/or access points using the one or more antennas 2104. Included in the device 2100 circuitry is the medium access control or MAC Circuitry 2132. MAC circuitry 2132 provides for controlling access to the wireless medium. In an exemplary embodiment, the MAC circuitry 2132 may be arranged to contend for the wireless medium and configure frames or packets for communicating over the wireless medium.

The device 2100 can also optionally contain a security module (not shown). This security module can contain information regarding but not limited to, security parameters required to connect the device to an access point or other device, or vice versa, or other available network(s), and can include WEP or WPA/WPA-2 (optionally +AES and/or TKIP) security access keys, network keys, etc. As an example, the WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

The exemplary device 2100 can also include a GPU 2140, an accelerator 2148, multiplexer/demultiplexer 2144, a Wi-Fi/BT/BLE PHY module 2180 and a Wi-Fi/BT/BLE MAC module 2184 that at least cooperate with one or more of the other components as discussed herein. In operation, exemplary behaviour of a wireless system commences with the transmitter side of a communication system including, for example, two or more of the wireless devices 2100.

When it is determined that wake-up of a main radio is required, the LP-WUR controller 2152, communicating with the packet assembler 2160, wake-up pulse allocator 2164, controller 2120 and memory 2116 assemble a wake-up pulse for a wake-to packet to be transmitted to a receiving transceiver, to wake-up the main radio of the receiving transceiver.

As discussed, the packet assembler 2160 and wake-up pulse allocator 2164 allocate the wake-up pulse to the approximate center of the band without nulling the central subcarriers around DC. The LP-WUR controller 2152, communicating with the packet assembler 2160, wake-up pulse allocator 2164, controller 2120 and memory 2116 also allocate guard bands around the wake-up pulse.

The LP-WUR controller 2152, communicating with the packet assembler 2160, wake-up pulse allocator 2164, controller 2120 and memory 2116 then allocate subcarrier indices corresponding to IEEE 802.11ax RUs.

The transmitter 2188 then transmits the wake-up packet.

At the receiving transceiver, the LPRs 2156a-2156c receive LP packets and wake-up packets. Demodulator 2128 demodulates the received LP packets and wake-up packets and uses the envelope detector 2168 to detect the wake-up pulse in the wake-up packet. The LPRs 2156a-2156c then trigger the wake-up of one or more wireless radio components 2170-2192.

Figure 22:
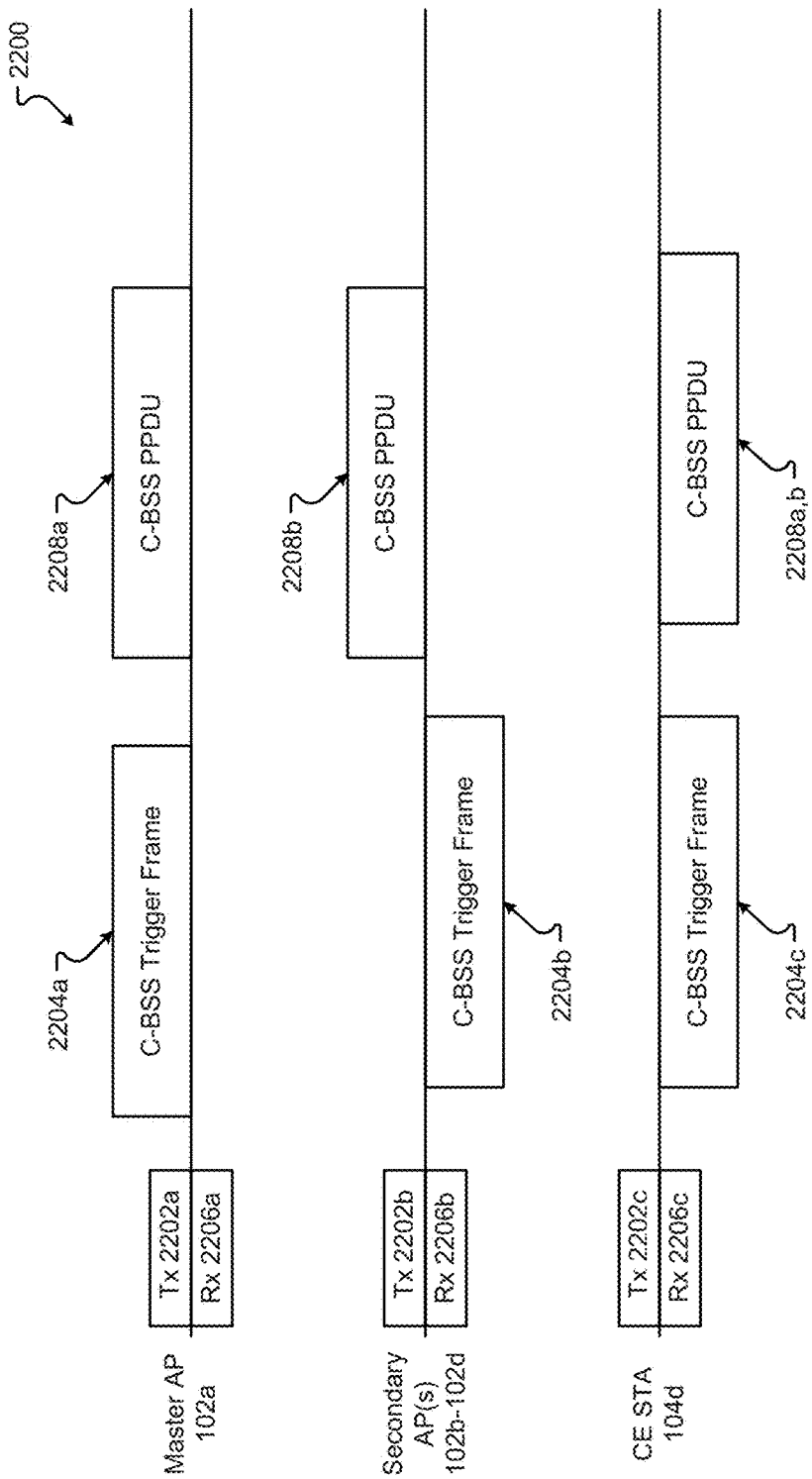
FIG. 22 is a signalling diagram for an embodiment of a communication session between a CE STA, a master AP, and/or an assisting STA to exchange link parameters.
Figure 23:
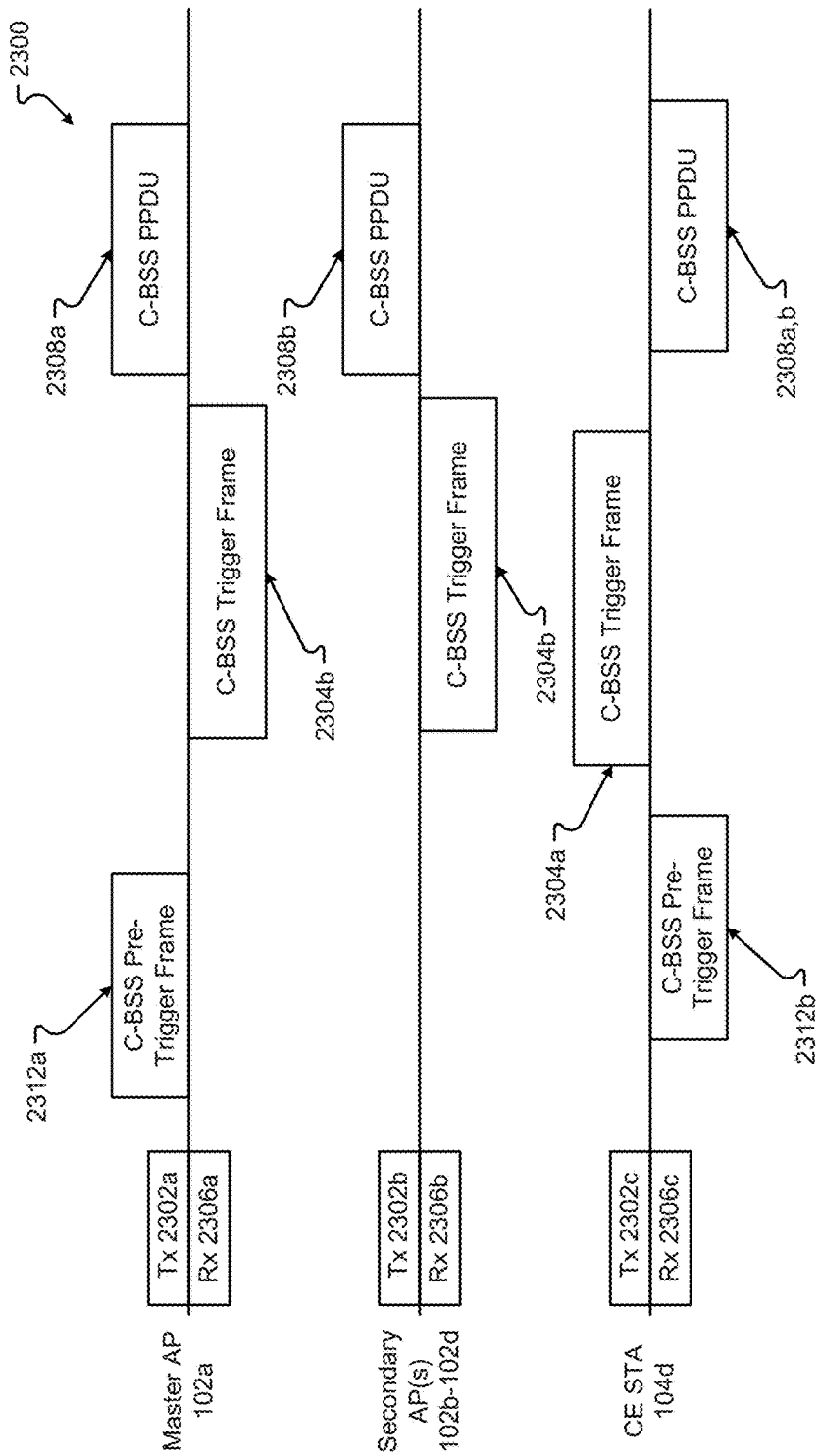
FIG. 23 is another signalling diagram for an embodiment of a communication session between a CE STA, a master AP, and/or an assisting STA to exchange link parameters.
Figure 24:
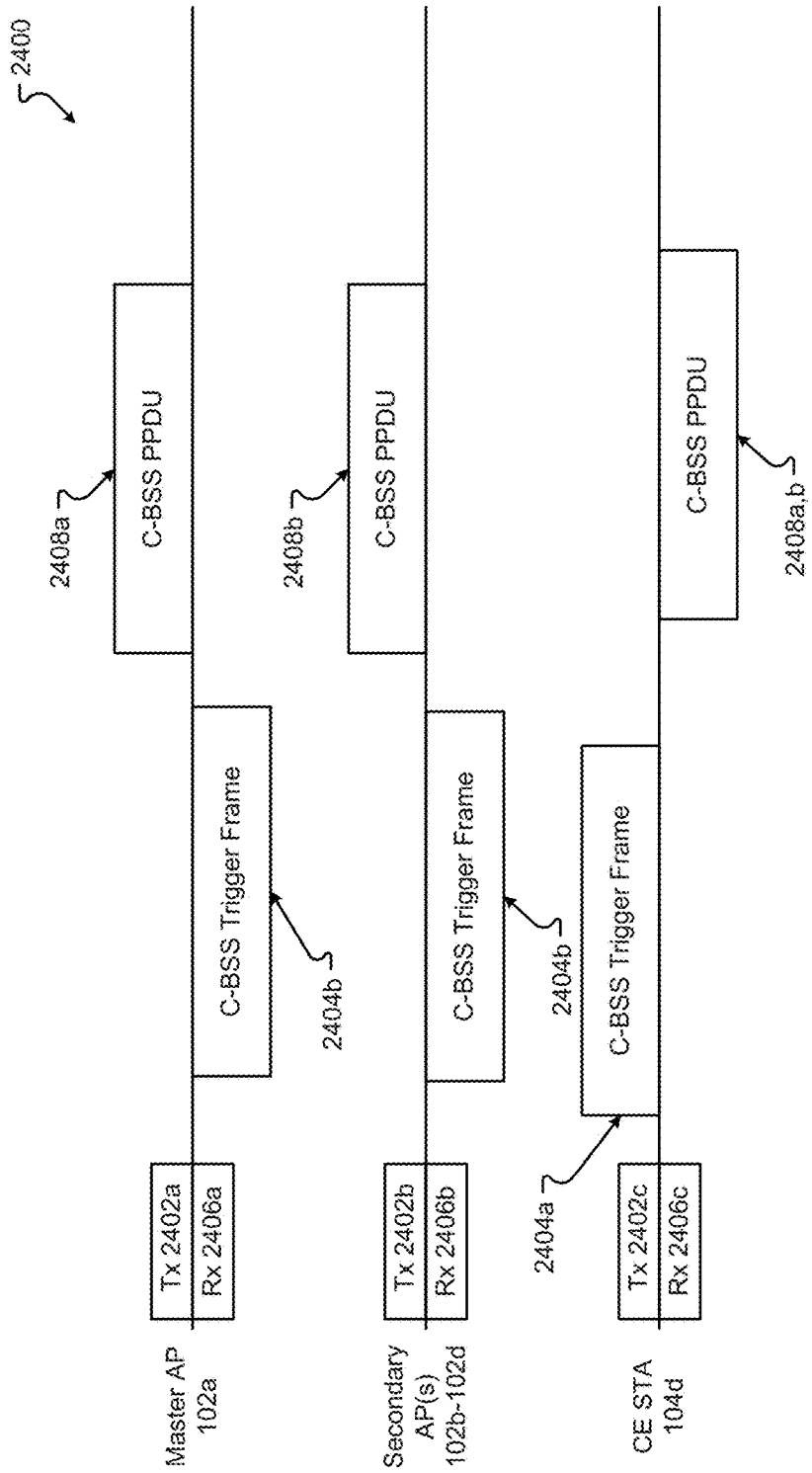
FIG. 24 is another signalling diagram for an embodiment of a communication session between a CE STA, a master AP, and/or an assisting STA to exchange link parameters.

To conduct CoMP, various trigger frames and/or pre-trigger frames, e.g., 1312, are needed to coordinate the transmissions to and from the APs 102. The trigger frames and/or pre-trigger frames can provide other information that can allow for per-link MCS settings. FIGS. 22-24 show some examples of when and how the trigger frames are provided in the CoMP BSS (C-BSS).

An embodiment of signalling procedure 2200, provided in FIG. 22, shows how to trigger CoMP transmissions for the C-BSS in WLAN 103. Different signalling events occur for a master AP 102a, either as a transmit event 2202a or a receive event 2206a. Similarly, signalling events occur for an assisting AP(s) 102b-202d, either as a transmit event 2202b or a receive event 2206b. Finally, signalling events occur for a CE STA 104d, either as a transmit event 2202c or a receive event 2206c. The signalling event in procedure 2200 occurs when the master AP 102a triggers the C-BSS transmissions.

The master AP 102a sends a C-BSS trigger frame (TF) 2204a, which is received by the assisting AP(s) 102b-102d and the CE STA 104d as the C-BSS TF 2204b and 2204c, respectively. The C-BSS TF 2204 can contain the specific information to parameterize the C-BSS transmissions. A C-BSS TF 2204 may be a new frame or may be part of an existing frame, e.g., trigger 1312, ready-to-send/clear-to-send frames, etc., where the new C-BSS information is included as additional information. After the short inter-frame space (SIFS) that occurs after the C-BSS TF 2204, the master AP 102a and the assisting AP(s) 102b-102d can send C-BSS PPDUs 2208a and 2208b, respectively, to the CE STA 104d, which are received as C-BSS PPDU 2208a, b. The exchange of C-BSS PPDUs can be as explained above.

Another embodiment of signalling procedure 2300, provided in FIG. 23, includes C-BSS pre-trigger frame transmissions, in the C-BSS, in WLAN 103. Different signalling events occur for a master AP 102a, either as a transmit event 2302a or a receive event 2306a. Similarly, signalling events occur for an assisting AP(s) 102b-202d, either as a transmit event 2302b or a receive event 2306b. Finally, signalling events occur for a CE STA 104d, either as a transmit event 2302c or a receive event 2306c. The signalling event(s) in procedure 2300 occurs when the master AP 102a triggers the C-BSS transmissions.

In the procedure 2300 in FIG. 23, the master AP 102a may send a C-BSS pre-trigger frame 2312a (pre-TF), containing the specific information to parameterize the C-BSS transmissions (e.g., MCS, etc.), to the CE STA 104d, which is received as C-BSS pre-TF 2312b. The CE STA 104d may then incorporate the parameters into a C-BSS TF 2304a. Again, after SIFS, the CE STA 104d can gain access to the channel according to the clear channel assessment (CCA) and can send the C-BSS TF 2304a, which is received by the master AP 102a and the assisting AP(s) 102b-102d as the C-BSS TF 2304b.

The C-BSS TF 2304 can contain the specific information to parameterize the C-BSS transmissions. A C-BSS TF 2304 may be a new frame or may be part of an existing frame, e.g., trigger 1312, ready-to-send/clear-to-send frames, etc., where the new C-BSS information is included as additional information. After the SIFS that occurs after the C-BSS TF 2304, the master AP 102a and the assisting AP(s) 102b-102d can send C-BSS PPDUs 2308a and 2308b, respectively, to the CE STA 104d, which are received as C-BSS PPDU 2308a,b. The exchange of C-BSS PPDUs can be as explained above.

Still another embodiment of the signalling procedure 2400, provided in FIG. 24 shows how to trigger C-BSS communication in WLAN 103. Different signalling events occur for a master AP 102a, either as a transmit event 2402a or a receive event 2406a. Similarly, signalling events occur for an assisting AP(s) 102b-202d, either as a transmit event 2402b or a receive event 2406b. Finally, signalling events occur for a CE STA 104d, either as a transmit event 2402c or a receive event 2406c. The signalling event in procedure 2400 occurs when the CE STA 104d triggers the C-BSS transmissions.

The CE STA 104d can gain access to the channel, according to the CCA, and can send a C-BSS TF 2404a, which is received by the assisting AP(s) 102b-102d and the master AP 102a as the C-BSS TF 2404b. The C-BSS TF 2404 can contain the specific information to parameterize the C-BSS transmissions. A C-BSS TF 2404 may be a new frame or may be part of an existing frame, e.g., trigger 1312, ready-to-send/clear-to-send frames, etc., where the new C-BSS information is included as additional information. After the SIFS that occurs after the C-BSS TF 2404, the master AP 102a and the assisting AP(s) 102b-102d can send C-BSS PPDUs 2408a and 2408b, respectively, to the CE STA 104d, which are received as C-BSS PPDU 2408a,b. The exchange of C-BSS PPDUs can be as explained above.

A data structure 2500 that can be contained in or embody the TFs 2204, 2304, and/or 2404 and/or pre-TF 2312 may be as shown in FIGS. 25A and 25B. The data structure 2500 can include a first portion of data 2504, shown in FIG. 25A. The data structure 2500 can represent the C-BSS parameters discussed above in conjunction with FIGS. 22-24 but may exclude data in the TFs 2204, 2304, and/or 2404 and/or pre-TF 2312 typically included to transmit or receive the TFs 2204, 2304, and/or 2404 and/or pre-TF 2312.

Data in portion 2504 can include one or more of, but is not limited to: a STA address 2504, common transmission parameters 2512, a master AP address 2516, one or more master AP transmission parameters 2520, a first assisting AP address 2524 (Secondary AP 1 address), first assisting AP transmission parameters (Secondary AP 1 transmission parameters), optionally, other assisting AP address 2532 (Secondary AP N address), and/or, optionally, another assisting AP transmission parameters (Secondary AP N transmission parameters) 2536. There may be one or more assisting AP addresses and assisting AP transmission parameters, and, thus, fields 2532 and 2536 may not be included in portion 2504 in some configurations. Further, there may be more or fewer fields than those shown in portion 2504, as represented by ellipses 2540.

The STA address 2504 includes an address for the CE STA 104d. The STA address 2504 can be any addresses (or identifiers(IDs)) used to transmit data to the CE STA 104d, for example. a MAC address, a uniform resource locator (URL), a network address, etc. To transmit the CoMP data; the STA address 2504 is used by the APs 102 to send coordinated data to the same STA 104.

Common transmission parameters 2512 can include any transmission settings or parameters that are common to all the APs 102 in the C-BSS for the transmission to the CE STA 104d. For example, the common transmission parameters 2512 can include a guard interval, a transmit frequency, a modulation type, a forward error correction (FEC) rate, etc.

Similar to the STA address 2504, the master AP address 2516 includes an address for the master AP 102a. The master AP address 2516 can be any addresses (or IDs) used to transmit data to the master AP 102a, for example. a MAC address, a URL, a network address, etc. To transmit the CoMP data, the master AP address 2516 may be used by the APs 102 to send link information to the same master AP 102a or by the CE STA 104d to receive or send data to the master AP 102a.

The master AP transmission parameters 2520 can include any transmission parameters that are unique to the link between the master AP 102a and the CE STA 104d. These parameters 2520 may be as explained in conjunction with FIG. 25B.

Similar to the STA address 2504 and/or the master AP address 2516, the assisting AP 1 address 2524 and/or the assisting AP N address 2532 may include an address for one of the one or more assisting APs 102b-102d. The assisting AP 1 address 2524 and/or the assisting AP N address 2532 can be any addresses (or IDs) used to transmit data to the one or more assisting APs 102b-102d, for example. a MAC address, a URL, a network address, etc. To transmit the CoMP data, the assisting AP 1 address 2524 and/or the assisting AP N address 2532 may be used by the master AP 102a to send data to or receive data from the one or more assisting APs 102b-102d and/or used by the CE STA 104d to send data to or receive data from the one or more assisting APs 102b-102d.

The assisting AP 1 transmission parameters 2528 and/or the assisting AP N transmission parameters 2536 can include transmission parameters that are unique to the links between the one or more assisting APs 102b-102d and the CE STA 104d. These parameters 2528, 2536 may be as explained in conjunction with FIG. 25B.

The per-link transmission parameters 2544 that may be unique to the links between the CE STA 104d and the master AP 102a and/or the one or more assisting APs 102b-102d may be as shown in FIG. 25B. Per-link transmission parameters 2544 can include one or more of, but are not limited to: a bandwidth 2548, a channel 2552, a resource unit (RU) allocation 2556, a number of spatial streams 2560, a modulation and coding scheme (MCS) 2564, a space-time block coding (STBC) 2568, and/or smoothing/beamforming 2572. More or fewer parameters may be included in the per-link transmission parameters 2544 than those shown in FIG. 25B, as represented by ellipses 2576.

The bandwidth 2548 can be a setting for the amount of bandwidth the transmitting AP 102 is using in the link to the CE STA 104d. Bandwidth 2548 can be provided in Mbps or another measure. The channel 2552 can be a setting for the channel in a MIMO or other scheme to be used by the AP 102. Channel setting 2552 may be provided by a channel ID, frequency, and/or other measure. The resource unit (RU) allocation 2556 may identify which RUs the AP 102 is to use for data transmission. An RU 2556 may be identified by RU ID or other characteristic. The number of spatial streams 2560 can identify the number of spatial streams the AP 102 can or does send to the CE STA 104d using spatial sharing.

MCS 2564 can include the modulation and coding scheme used by the AP 102 to transmit to the CE STA 104d. MCS 2564 can include various data, for example, the coding type, coding rate, modulation type, etc. STBC 2568 can include whether STBC is done and which antennas may receive the copies of the signal. Smoothing and beamforming 2572 may indicate whether the AP 102 uses these procedures and how smoothing and beamforming are done. The above parameters are generally understood by one skilled in the art and need not be explained in detail herein. Rather, this description provides examples of parameters that may be established for each link between an AP 102 and the CE STA 104d that should be communicated to the CE STA 104d to receive the data transmitted on the link.

Figure 26A:
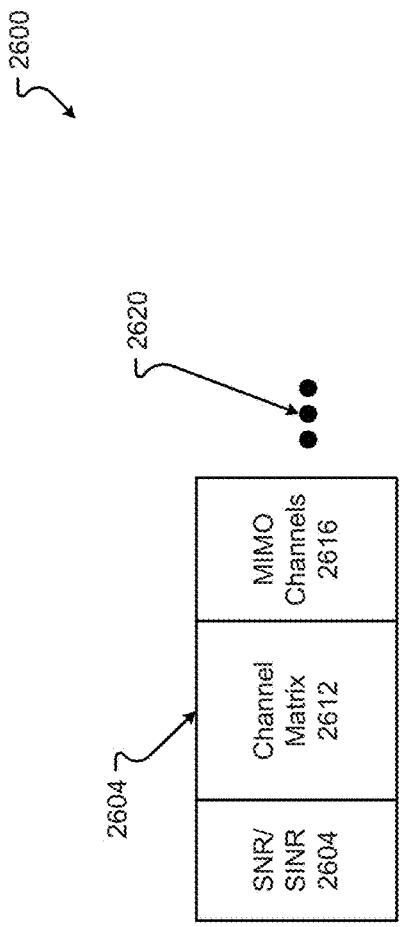
FIG. 26A is illustrates an embodiment of link characteristics sent to a master AP to determine link parameters.

A data structure 2600 that can include link information, parameters, and/or characteristics and may be transmitted between the one or more assisting APs 102b-102d and the master AP 102a may be as shown in FIG. 26A. The data structure 2600 can include a first portion of data 2604, shown in FIG. 26A. The data structure 2604 can represent the characteristics of the link between the one or more assisting APs 102b-102d to the CE STA 104d. The link characteristics 2604 can be used to determine the MCS or other parameters for the several links from the one or more assisting APs 102b-102d to the CE STA 104d. These link characteristics may be transmitted to the master AP 102a to allow the master AP 102a to decide the link parameters 2500 for the one or more assisting APs 102b-102d. Data in portion 2604 can include one or more of, but is not limited to: signal to noise ratio (SNR) and/or signal-to-interference-plus-noise ratio (SINR) data 2604, a channel matrix 2612, and/or MIMO channels 2616. There may be more or fewer field than those shown in portion 2604, as represented by ellipses 2620.

The SNR and/or SINR 2604 is a quantity used to give theoretical upper bounds on channel capacity. The ratio may be provided in decibels, possibly, for one or more channels. The channel matrix 2612 can be a description of the channel model for a MIMO system for the whole channel. MIMO channels 2616 can describe the channels used for MIMO operation.

Figure 26B:
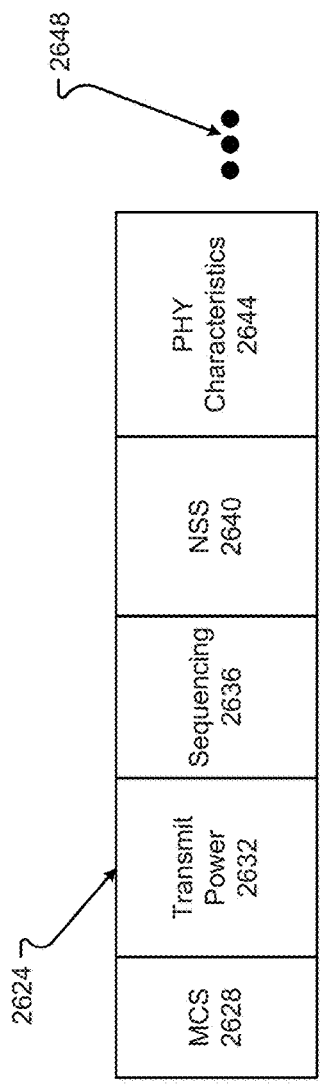
FIG. 26B is illustrates another embodiment of a link parameter(s) sent to the master AP.

A data structure 2624 that can include parameters set by the master AP 102a and sent to the one or more assisting APs 102*b*-102*d* or set by an assisting AP 102*b*-102*d* and sent to the master AP 102*a* may be as shown in FIG. 26B. The data structure 2624 can be used to establish the MCS or other settings for the several links from the one or more assisting APs 102*b*-102*d* to the CE STA 104*d*. Data in data structure 2624 can include one or more of, but is not limited to: MCS 2628, transmit power 2632, sequencing 2636, number of spatial streams (NSS) 2640, and/or PHY characteristics 2644. There may be more or fewer field than those shown in portion 2624, as represented by ellipses 2648.

MCS 2628 can include the modulation and coding scheme, similar to MCS 2564, used by the one or more assisting APs 102*b*-102*d* to transmit to the CE STA 104*d*. MCS 2628 can include various data, for example, the coding type, coding rate, modulation type, etc. Transmit power 2632 can include the power to be used for transmitting to the CE STA 104*d*. Sequencing 2636 can include the information required by the one or more assisting APs 102*b*-102*d* to transmit the data packet in the proper time slot with the other coordinated assisting APs 102*b*-102*d* and the master AP 102*a*. NSS 2640 can include the number of spatial streams to be used by the one or more assisting APs 102*b*-102*d*. Other PHY characteristics 2644 can also be set, for example, data rates, frequencies, etc.

Figure 27:
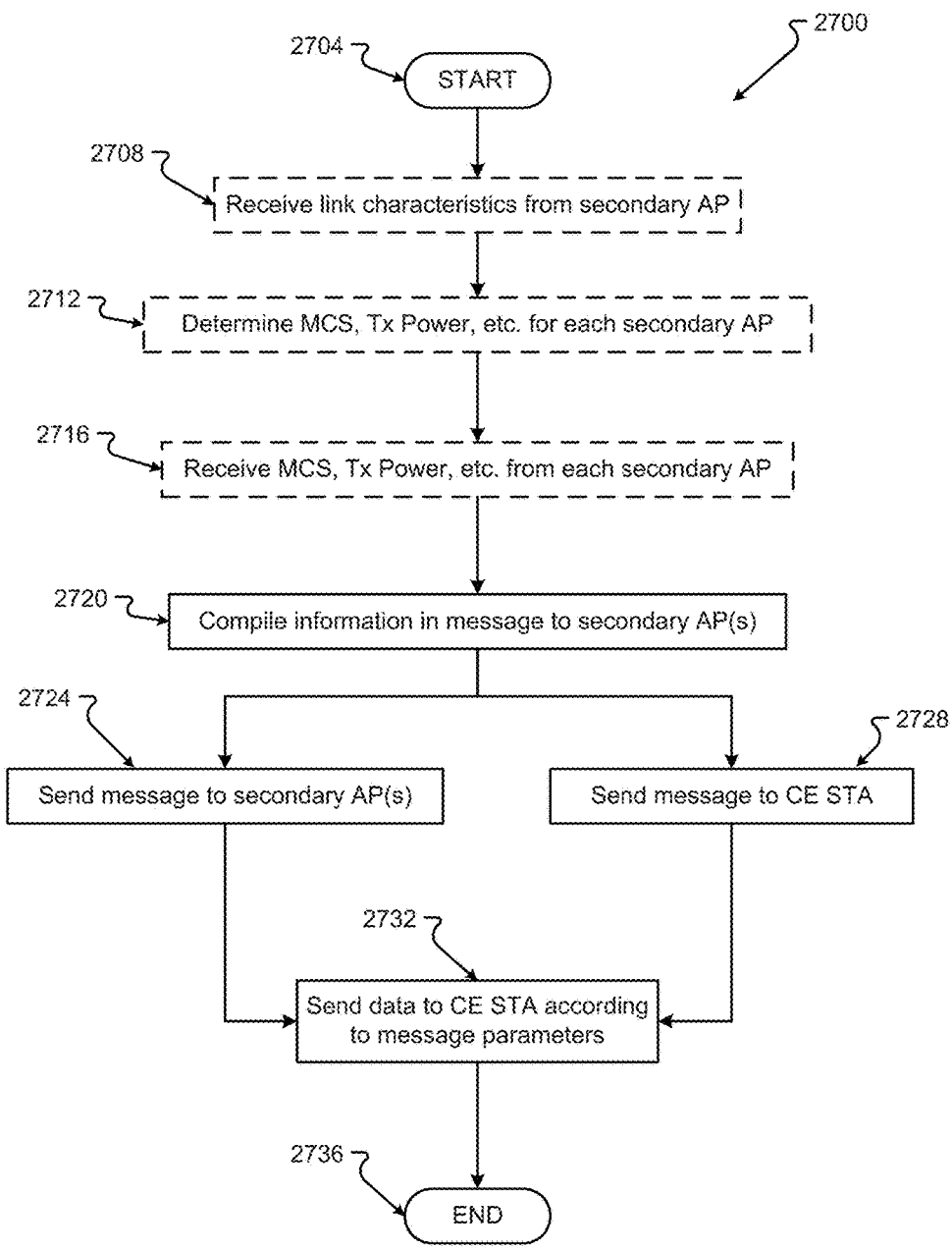
FIG. 27 is a flowchart outlining an exemplary technique for exchanging link parameters from the perspective of the master AP.
Figure 28:
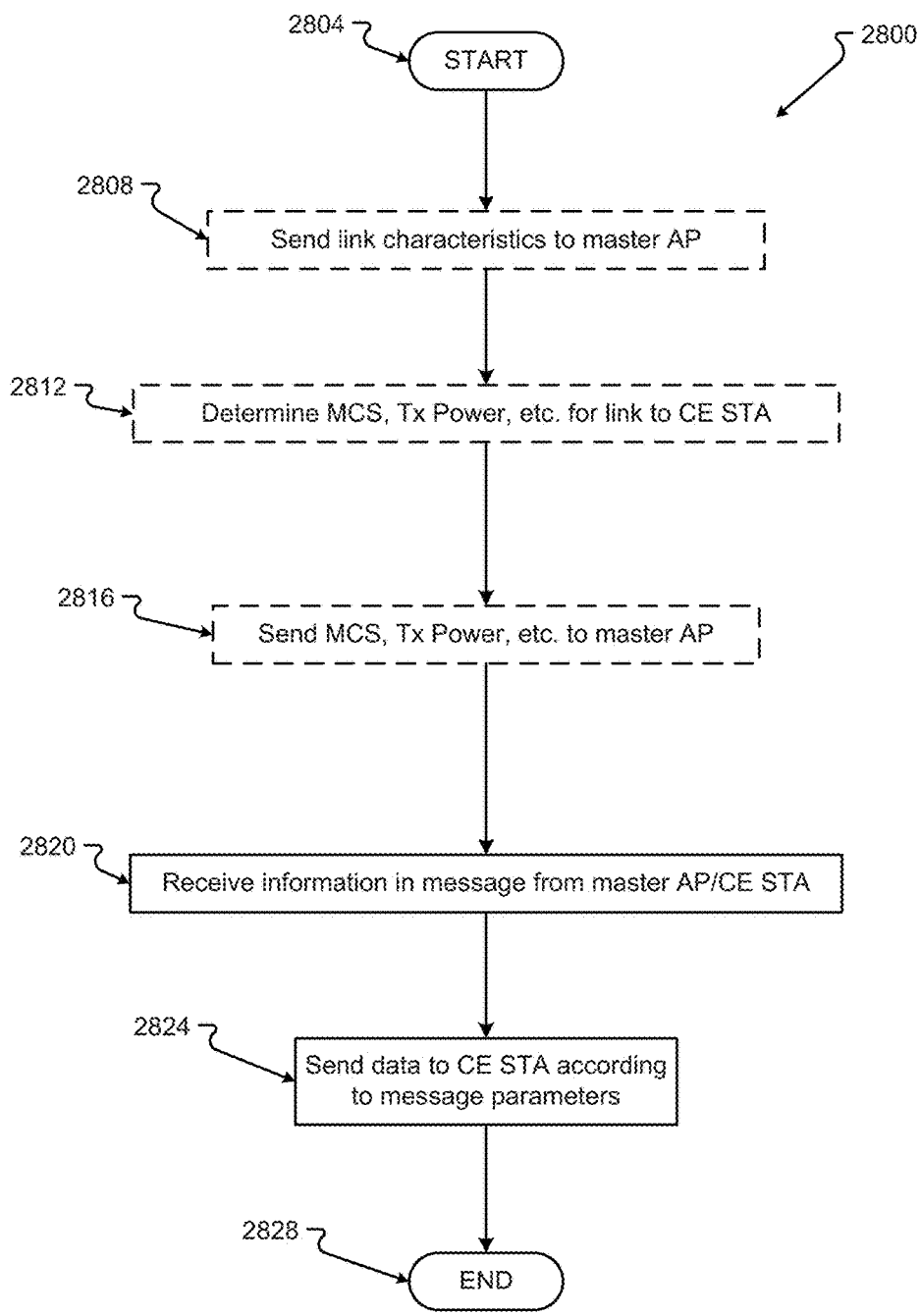
FIG. 28 is a flowchart outlining an exemplary technique for exchanging link parameters from the perspective of the assisting AP.
Figure 29:
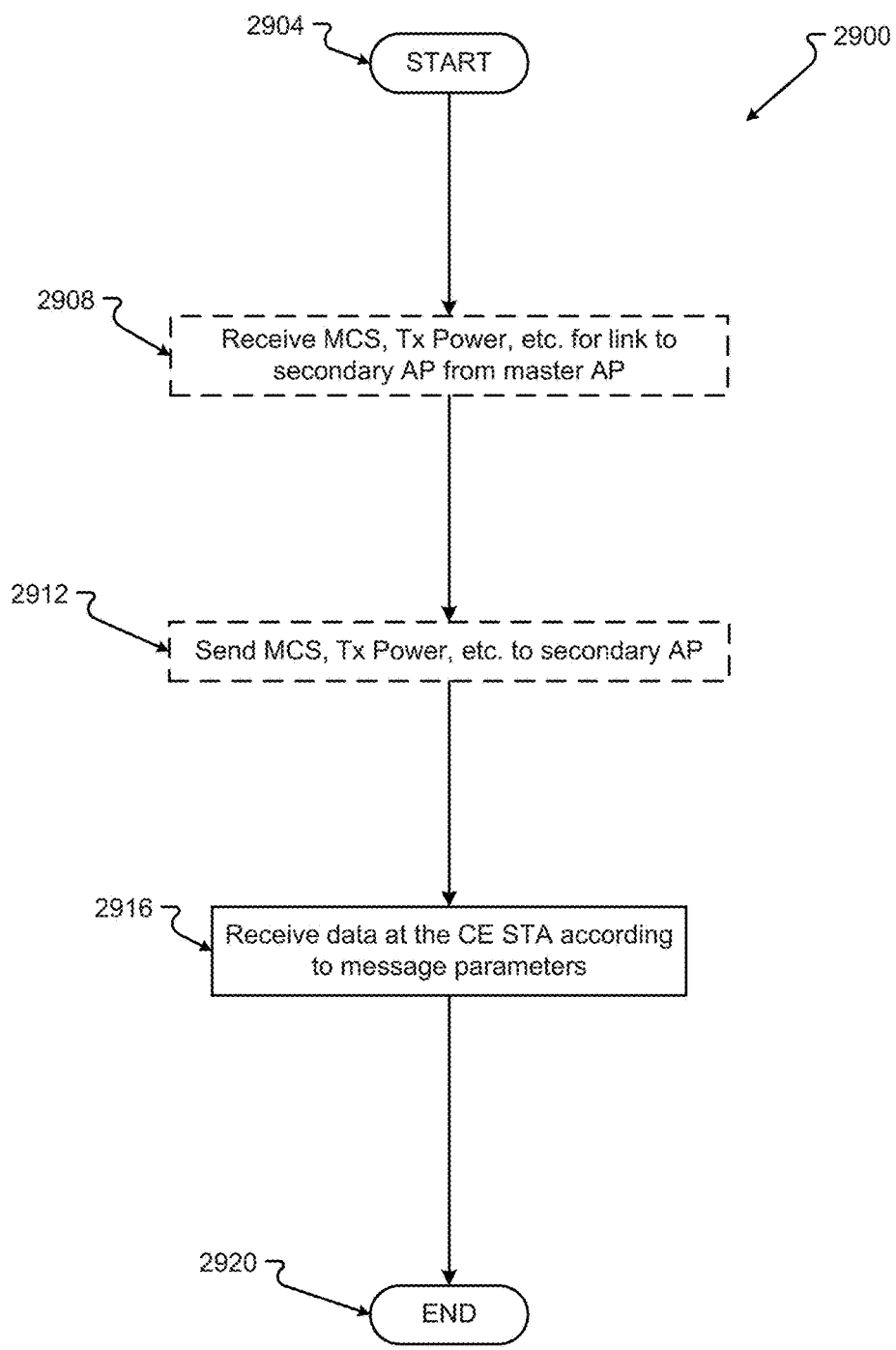
FIG. 29 is a flowchart outlining an exemplary technique for exchanging link parameters from the perspective of the CE STA.

The C-BSS transmission/reception processes 2700, 2800, 2900 will be described with reference to FIGS. 27 through 29. The processes 2700, 2800, 2900, conducted by the master AP 102*a*, the one or more assisting APs 102*b*-102*d*, and/or the CE STA 104*d*, may be as shown in FIGS. 27 through 29. A general order for the steps of the methods 2700, 2800, 2900 are shown in FIGS. 27 through 29. Generally, the methods 2700, 2800, 2900 start with a start operation 2704, 2804, 2904 and end with operation 2736, 2828, 2920. The methods 2700, 2800, 2900 can include more or fewer steps or can arrange the order of the steps differently than those shown in FIGS. 27 through 29. The methods 2700, 2800, 2900 can be executed as a set of computer-executable instructions executed by a computer system or processor and encoded or stored on a computer readable medium or performed by a series of components, circuits, gates etc. provided in an Application Specific Integrated Circuit (ASIC, a Field Programmable Gate Array (FPGA), a system-on-chip (SOC), or other hardware device. Hereinafter, the methods 2700, 2800, 2900 shall be explained with reference to the systems, components, circuits, modules, software, data structures, signalling processes, etc. described in conjunction with FIGS. 1-26B.

The controller 2120 of the master AP 102*a* can request link characteristics from the one or more assisting APs 102*b*-102*d* over the backhaul connection between the APs 102 in the C-BSS 103. Each of the controllers 2120 in the one or more assisting APs 102*b*-102*d* can receive the request and generate message 2604. The Network Interface (not shown) of the one or more assisting APs 102*b*-102*d* may then sent the message 2604 to the master AP 102*a*, in optional step 2808. In some configurations, the message 2604 may be send back over the backhaul link or may be wirelessly transmitted to the master AP 102*a*. The network interface of the master AP 102*a* can receive the message 2604, in optional step 2708.

From the link characteristics 2604 from the one or more assisting APs 102*b*-102*d*, the controller 2120 of the master AP 102*a* can determine transmission parameters 2544 for the master AP 102*a* and the one or more assisting APs 102*b*-102*d*, in optional step 2712. The transmission parameters 2544 can be determined to best optimize the several links to the CE STA 104*d* and prevent interference, if possible.

In another configuration, the one or more assisting APs 102*b*-102*d* determine the transmission parameters 2544, in optional step 2812. Then, the network interface of the one or more assisting APs 102*b*-102*d* can send those parameters 2544 to the master AP 102*a*, in optional step 2816, rather than the link characteristics 2604. Master AP 102*a* can receive the parameters 2544, in optional step 2716.

Regardless of whether the master AP 102*a* determines or receives the transmission parameters 2544, the master AP 102*a* can compile the information 2544 into a message 2504 for the one or more assisting APs 102*b*-102*d* and the CE STA 104*d*, in step 2720. The master AP 102*a* can then determine how to send the message 2504 to the one or more assisting APs 102*b*-102*d* and the CE STA 104*d*. In one configuration, the network interface of the master AP 102*a* sends the link parameters 2624 containing some or all of the parameters from message 2544 over the backhaul to the one or more assisting APs 102*b*-102*d*, in step 2724. If the master AP 102*a* is to transmit wirelessly the parameters 2544 to the one or more assisting APs 102*b*-102*d*, the controller 2120 of the master AP 102*a* can include the parameters 2544, as part of a frame 2504, in an existing message (e.g., an RTS/CTS frame), in a trigger frame 2204*a*, or in a pre-TF 2312*a* that can be sent, with the RF component(s) (e.g., the transmitter 2164, the receiver 2168, the PHY Module 2156, the MAC module 2160, etc.), to the one or more assisting APs 102*b*-102*d*, in step 2724.

In another situation, the master AP 102*a* can send the frame 2504 as part of a pre-TF 2312*a* to the CE STA 104*d*, in step 2728. The RF component(s) of the CE STA 104*d* may receive the pre-TF 2312*b*, in step 2908. Then, the controller 2120 of the CE STA 104*d* can create the message 2504 with the parameters 2544, and the RF components can send the message 2504 as a C-BSS TF 2304*a*, in step 2912. In other configurations, the RF component(s) of the CE STA 104*d* receives the parameters 2544 or link information 2604, from the master AP 102*a* and one or more assisting APs 102*b*-102*d*, and determines and/or includes those parameters 2544, in a frame 2504, provided in a C-BSS TF 2404, without receiving a pre-TF, in step 2912. Thus, the CE STA 104*d* controls the transmissions in the C-BSS.

The one or more assisting APs 102*b*-102*d* can receive the transmission parameters 2544 in message 2504, as part of a backhaul transmission, a TF 2204*b*, a TF 2304*b*, or a TF 2404*b*, in step 2820. Based on the parameters 2544, the controller 2120 with RF component(s), of the master AP 102*a*, sends data to the CE STA 104*d*, in step 2732, in coordination with the controller 2120 with RF component(s), of the one or more assisting APs 102*b*-102*d*, that sends data, based on the parameters 2544, to the CE STA 104*d*, in step 2824. The CE STA 104*d* can receive the data, in step 2916, as C-BSS PPDUs 2208, as already explained above.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments are described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising: a controller, associated with a master access point (AP), to associate with an assisting AP, wherein each AP sends data to and/or receives data from a station (STA) on a subchannel; the controller to compile link parameters in a message for each of the master AP and the assisting AP, wherein the link parameters determine how each of the master AP and the assisting AP will send data to the STA that is in communication with each of the master AP and the assisting AP; and the controller to send the link parameters to at least the assisting AP.

Any of the one or more above aspects, wherein the controller sends the link parameters to the assisting AP over a backhaul connection to the assisting AP.

Any of the one or more above aspects, wherein the controller further includes the link parameters in a trigger frame that the wireless radio sends wirelessly to the STA.

Any of the one or more above aspects, wherein the controller further includes the link parameters in a pre-trigger frame that a wireless radio, in communication with the controller, sends wirelessly to the STA, and wherein the STA wirelessly sends a trigger frame, including the link parameters, to the assisting AP.

Any of the one or more above aspects, wherein the link parameters include a modulation and coding scheme (MCS) for a wireless link between the assisting AP and the STA.

Any of the one or more above aspects, wherein the controller further receives link characteristics from the assisting AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A method comprising: associating with a master access point (AP), to associate with an assisting AP, wherein each AP sends data to and/or receives data from a station (STA) on a subchannel; compiling link parameters in a message for each of the master AP and the assisting AP, wherein the link parameters determine how each of the master AP and the assisting AP will send data to the STA that is in communication with each of the master AP and the assisting AP; and sending the link parameters to at least the assisting AP.

Any of the one or more above aspects, wherein the controller sends the link parameters to the assisting AP over a backhaul connection to the assisting AP.

Any of the one or more above aspects, wherein the controller further includes the link parameters in a trigger frame that the wireless radio sends wirelessly to the STA.

Any of the one or more above aspects, wherein the controller further includes the link parameters in a pre-trigger frame that a wireless radio, in communication with the controller, sends wirelessly to the STA, and wherein the STA wirelessly sends a trigger frame, including the link parameters, to the assisting AP.

Any of the one or more above aspects, wherein the link parameters include a modulation and coding scheme (MCS) for a wireless link between the assisting AP and the STA.

Any of the one or more above aspects, wherein the controller further receives link characteristics from the assisting AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A non-transitory information storage media having stored thereon one or more instructions, that when executed by one or more processors, cause a wireless communications device to perform a method, the method comprising: associating with a master access point (AP), to associate with an assisting AP, wherein each AP sends data to and/or receives data from a station (STA) on a subchannel; compiling link parameters in a message for each of the master AP and the assisting AP, wherein the link parameters determine how each of the master AP and the assisting AP will send data to the STA that is in communication with each of the master AP and the assisting AP; and sending the link parameters to at least the assisting AP.

Any of the one or more above aspects, wherein the controller sends the link parameters to the assisting AP over a backhaul connection to the assisting AP.

Any of the one or more above aspects, wherein the controller further includes the link parameters in a trigger frame that the wireless radio sends wirelessly to the STA.

Any of the one or more above aspects, wherein the controller further includes the link parameters in a pre-trigger frame that a wireless radio, in communication with the controller, sends wirelessly to the STA, and wherein the STA wirelessly sends a trigger frame, including the link parameters, to the assisting AP.

Any of the one or more above aspects, wherein the link parameters include a modulation and coding scheme (MCS) for a wireless link between the assisting AP and the STA.

Any of the one or more above aspects, wherein the controller further receives link characteristics from the assisting AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A wireless communications comprising:
means for associating with a master access point (AP), to associate with an assisting AP, wherein each AP sends data to and/or receives data from a station (STA) on a subchannel; means for compiling link parameters in a message for each of the master AP and the assisting AP, wherein the link parameters determine how each of the master AP and the assisting AP will send data to the STA that is in communication with each of the master AP and the assisting AP; and means for sending the link parameters to at least the assisting AP.

Any of the one or more above aspects, wherein a controller sends the link parameters to the assisting AP over a backhaul connection to the assisting AP.

Any of the one or more above aspects, wherein the controller further includes the link parameters in a trigger frame that the wireless radio sends wirelessly to the STA.

Any of the one or more above aspects, wherein the controller further includes the link parameters in a pre-trigger frame that a wireless radio, in communication with the controller, sends wirelessly to the STA, and wherein the STA wirelessly sends a trigger frame, including the link parameters, to the assisting AP.

Any of the one or more above aspects, wherein the link parameters include a modulation and coding scheme (MCS) for a wireless link between the assisting AP and the STA.

Any of the one or more above aspects, wherein the controller further receives link characteristics from the assisting AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A wireless communications device comprising:
a controller, associated with an assisting access point (AP), to associate with a master AP, wherein each AP sends data to and/or receives data from a station (STA) on a subchannel; the controller to receive link parameters in a message from the master AP, wherein the link parameters determine how the assisting AP will send data to the STA that is in communication with each of the master AP and the assisting AP; and a radio frequency component to send data to the STA based on the link parameters.

Any of the one or more above aspects, wherein the controller receives the link parameters at the assisting AP over a backhaul connection to the assisting AP.

Any of the one or more above aspects, wherein the controller receives the link parameters in a trigger frame that the wireless radio sends wirelessly to the STA.

Any of the one or more above aspects, wherein the controller receives the link parameters in a trigger frame from the STA, wherein the STA receives the link parameters from the master AP in a pre-trigger frame.

Any of the one or more above aspects, wherein the link parameters include a modulation and coding scheme (MCS) for a wireless link between the assisting AP and the STA.

Any of the one or more above aspects, wherein the controller further sends link characteristics to the master AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A method comprising: associating with an assisting access point (AP), to associate with a master AP, wherein each AP sends data to and/or receives data from a station (STA) on a subchannel; receiving link parameters in a message from the master AP, wherein the link parameters determine how the assisting AP will send data to the STA that is in communication with each of the master AP and the assisting AP; and sending data to the STA based on the link parameters.

Any of the one or more above aspects, wherein a controller receives the link parameters at the assisting AP over a backhaul connection to the assisting AP.

Any of the one or more above aspects, wherein a controller receives the link parameters in a trigger frame that the wireless radio sends wirelessly to the STA.

Any of the one or more above aspects, wherein a controller receives the link parameters in a trigger frame from the STA, wherein the STA receives the link parameters from the master AP in a pre-trigger frame.

Any of the one or more above aspects, wherein the link parameters include a modulation and coding scheme (MCS) for a wireless link between the assisting AP and the STA.

Any of the one or more above aspects, wherein the controller further sends link characteristics to the master AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A non-transitory information storage media having stored thereon one or more instructions, that when executed by one or more processors, cause a wireless communications device to perform a method, the method comprising: associating with an assisting access point (AP), to associate with a master AP, wherein each AP sends data to and/or receives data from a station (STA) on a subchannel; receiving link parameters in a message from the master AP, wherein the link parameters determine how the assisting AP will send data to the STA that is in communication with each of the master AP and the assisting AP; and sending data to the STA based on the link parameters.

Any of the one or more above aspects, wherein a controller receives the link parameters at the assisting AP over a backhaul connection to the assisting AP.

Any of the one or more above aspects, wherein a controller receives the link parameters in a trigger frame that the wireless radio sends wirelessly to the STA.

Any of the one or more above aspects, wherein a controller receives the link parameters in a trigger frame from the STA, wherein the STA receives the link parameters from the master AP in a pre-trigger frame.

Any of the one or more above aspects, wherein the link parameters include a modulation and coding scheme (MCS) for a wireless link between the assisting AP and the STA.

Any of the one or more above aspects, wherein the controller further sends link characteristics to the master AP.

Any of the one or more above aspects, wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A wireless communication device comprising: means for associating with an assisting access point (AP), to associate with a master AP, wherein each AP sends data to and/or receives data from a station (STA) on a subchannel; means for receiving link parameters in a message from the master AP, wherein the link parameters determine how the assisting AP will send data to the STA that is in communication with each of the master AP and the assisting AP; and means for sending data to the STA based on the link parameters.

The wireless communication device of claim 71, wherein a controller receives the link parameters at the assisting AP over a backhaul connection to the assisting AP.

The wireless communication device of claim 71, wherein a controller receives the link parameters in a trigger frame that the wireless radio sends wirelessly to the STA.

The wireless communication device of claim 71, wherein a controller receives the link parameters in a trigger frame from the STA, wherein the STA receives the link parameters from the master AP in a pre-trigger frame.

The wireless communication device of claim 72, wherein the link parameters include a modulation and coding scheme (MCS) for a wireless link between the assisting AP and the STA.

The wireless communication device of claim 75, wherein the controller further sends link characteristics to the master AP.

The wireless communication device of claim 76, wherein the link characteristics includes one or more of a signal-to-noise ratio, a signal-to-interference-to-noise ratio, a channel matrix, and/or a list of multiple input multiple output (MIMO) channels.

The wireless communication device of claim 77, wherein the link parameters for the assisting AP are based on the link characteristics.

The wireless communication device of claim 78, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

The wireless communication device of claim 71, wherein the assisting AP provides the link parameters to the master AP.

A wireless communications device comprising: a controller, associated with a basic service set (BSS) that comprises a master access point (AP) and an assisting AP, wherein each AP sends data to and/or receives data from wireless communications device on a subchannel; the controller to receive link parameters in a message, wherein the link parameters determine how each of the master AP and the assisting AP will send data to the wireless communications device that is in communication with each of the master AP and the assisting AP; and the controller to receive data from the master AP and the assisting AP based on the link parameters.

Any of the one or more above aspects, wherein the controller sends the link parameters to the assisting AP.

Any of the one or more above aspects, wherein the controller further includes the link parameters in a trigger frame that a wireless radio sends wirelessly to the assisting AP.

Any of the one or more above aspects, wherein the controller further receives the link parameters in a pre-trigger frame from the master AP.

Any of the one or more above aspects, wherein the link parameters include a modulation and coding scheme (MCS) for a wireless link between the assisting AP and the STA.

Any of the one or more above aspects, wherein the controller further contemporaneously receives coordinated data packets from the assisting AP and the master AP.

Any of the one or more above aspects, wherein the link parameters are based on link characteristics, and wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A method comprising: associating with a basic service set (BSS) that comprises a master access point (AP) and an assisting AP, wherein each AP sends data to and/or receives data from wireless communications device on a subchannel; receiving link parameters in a message, wherein the link parameters determine how each of the master AP and the assisting AP will send data to the wireless communications device that is in communication with each of the master AP and the assisting AP; and receiving data from the master AP and the assisting AP based on the link parameters.

Any of the one or more above aspects, wherein a controller sends the link parameters to the assisting AP.

Any of the one or more above aspects, wherein the controller further includes the link parameters in a trigger frame that a wireless radio sends wirelessly to the assisting AP.

Any of the one or more above aspects, wherein the controller further receives the link parameters in a pre-trigger frame from the master AP.

Any of the one or more above aspects, wherein the link parameters include a modulation and coding scheme (MCS) for a wireless link between the assisting AP and the STA.

Any of the one or more above aspects, wherein the controller further contemporaneously receives coordinated data packets from the assisting AP and the master AP.

Any of the one or more above aspects, wherein the link parameters are based on link characteristics, and wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A non-transitory information storage media having stored thereon one or more instructions, that when executed by one or more processors, cause a wireless communications device to perform a method, the method comprising: associating with a basic service set (BSS) that comprises a master access point (AP) and an assisting AP, wherein each AP sends data to and/or receives data from wireless communications device on a subchannel; receiving link parameters in a message, wherein the link parameters determine how each of the master AP and the assisting AP will send data to the wireless communications device that is in communication with each of the master AP and the assisting AP; and receiving data from the master AP and the assisting AP based on the link parameters.

Any of the one or more above aspects, wherein a controller sends the link parameters to the assisting AP.

Any of the one or more above aspects, wherein the controller further includes the link parameters in a trigger frame that a wireless radio sends wirelessly to the assisting AP.

Any of the one or more above aspects, wherein the controller further receives the link parameters in a pre-trigger frame from the master AP.

Any of the one or more above aspects, wherein the link parameters include a modulation and coding scheme (MCS) for a wireless link between the assisting AP and the STA.

Any of the one or more above aspects, wherein the controller further contemporaneously receives coordinated data packets from the assisting AP and the master AP.

Any of the one or more above aspects, wherein the link parameters are based on link characteristics, and wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A wireless communications device comprising:

means for associating with a basic service set (BSS) that comprises a master access point (AP) and an assisting AP, wherein each AP sends data to and/or receives data from wireless communications device on a subchannel; means for receiving link parameters in a message, wherein the link parameters determine how each of the master AP and the assisting AP will send data to the wireless communications device that is in communication with each of the master AP and the assisting AP; and means for receiving data from the master AP and the assisting AP based on the link parameters.

Any of the one or more above aspects, wherein a controller sends the link parameters to the assisting AP.

Any of the one or more above aspects, wherein the controller further includes the link parameters in a trigger frame that a wireless radio sends wirelessly to the assisting AP.

Any of the one or more above aspects, wherein the controller further receives the link parameters in a pre-trigger frame from the master AP.

Any of the one or more above aspects, wherein the link parameters include a modulation and coding scheme (MCS) for a wireless link between the assisting AP and the STA.

Any of the one or more above aspects, wherein the controller further contemporaneously receives coordinated data packets from the assisting AP and the master AP.

Any of the one or more above aspects, wherein the link parameters are based on link characteristics, and wherein the link characteristics includes one or more of a signal-to-noise ratio, a signal-to-interference-to-noise ratio, a channel matrix, and/or a list of multiple input multiple output (MIMO) channels.

Any of the one or more above aspects, wherein the link parameters for the assisting AP are based on the link characteristics.

Any of the one or more above aspects, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

Any of the one or more above aspects, wherein the assisting AP provides the link parameters to the master AP.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a controller, associated with a master access point (AP), to associate with an assisting AP, wherein each AP sends data to and/or receives data from a station (STA) on a subchannel;
the controller to compile link parameters in a message for each of the master AP and the assisting AP, wherein the link parameters determine how each of the master AP and the assisting AP will send data to the STA that is in communication with each of the master AP and the assisting AP; and the controller to send the link parameters to at least the assisting AP, wherein the controller sends the link parameters to the assisting AP over a backhaul connection to the assisting AP, and wherein the controller further includes the link parameters in a pre-trigger frame that a wireless radio, in communication with the controller, sends wirelessly to the STA, the link parameters forwardable in a trigger frame by a STA to the assisting AP.

2. The wireless communications device of claim 1, wherein the controller further includes the link parameters in a trigger frame that the wireless radio sends wirelessly to the STA.

3. The wireless communications device of claim 1, wherein the link parameters include a modulation and coding scheme (MCS) for a wireless link between the assisting AP and the STA.

4. The wireless communications device of claim 3, wherein the controller further receives link characteristics from the assisting AP.

5. The wireless communications device of claim 4, wherein the link characteristics includes one or more of a signal-to-noise ratio, a signal-to-interference-to-noise ratio, a channel matrix, and/or a list of multiple input multiple output (MIMO) channels.

6. The wireless communications device of claim 5, wherein the link parameters for the assisting AP are based on the link characteristics.

7. The wireless communications device of claim 6, wherein the link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

8. The wireless communications device of claim 1, wherein the assisting AP provides the link parameters to the master AP.

9. An access point (AP) in a wireless network, the AP comprising:
a transceiver to send and/or receive data from a cell-edge station CE STA;
a controller in communication with the transceiver, the controller to:
assume the master AP role in a collection of two or more APs;
determine an assisting AP(s) also in communication with the CE STA;
compile link parameters in a message for the assisting AP, wherein the link parameters determine how the assisting AP will send data to the CE STA over a link between the assisting AP and the CE STA; and
send the link parameters to at least the assisting AP through a backhaul connection to the assisting AP;
receive a transmission, containing a data packet, for the CE STA;
divide the data packet into segments;
a RF components radio in communication with the controller, the WiFi radio to:
wirelessly send the link parameters in a frame to the CE STA;
receive a CTS frame from the CE STA; and
in response to the CTS frame, transmit a second portion of the segments to the CE STA concurrently with the at least on assisting AP sending a first portion of the segments to the CE STA based on the link parameters.

10. The AP of claim 9, wherein the controller to include a second link parameters associated with a link between the master AP and the CE STA.

11. The AP of claim 10, wherein the frame is sent to the CE STA in a ready-to-send (RTS) signal.

12. The AP of claim 10, wherein the frame is sent to the CE STA in a trigger frame.

13. The AP of claim 10, wherein one of:
the controller to receive link characteristics for the link between the assisting AP and the CE STA and to base the link parameters, at least partially, on the link characteristics; or
the controller to receive the link parameters for the link between the assisting AP and the CE STA from the assisting AP and to incorporate the link parameters into the frame.

14. A method for communicating with a cell-edge station (CE STA), the method comprising:
associate a master access point (AP) with at least one assisting AP, wherein each of the master AP and the assisting AP sends and/or receives data on a subchannel to and from the CE STA, wherein the master AP has a first link, having first link characteristics, to the CE STA and the assisting AP has a second link, having second link characteristics, to the CE STA;
compile first link parameters in a frame for the master AP, wherein the first link parameters are based on the first link characteristics and the determine how the master AP will send data to the CE STA on the first link;
compile second link parameters in the frame for the assisting AP, wherein the second link parameters are based on the second link characteristics and the determine how the assisting AP will send data to the CE STA on the second link, wherein the second link parameters are different from the first link parameters; and
send the frame to the CE STA to receive data over both the first and second links.

15. The method of claim 14, further comprising:
receiving a transmission, containing a data packet, for the CE STA;
dividing the data packet into segments including at least a first portion and a second portion;
sending the first portion to the assisting AP, wherein the assisting AP transmits the first portion to the CE STA in coordination with the master AP, and wherein the assisting AP transmits the first portion to the CE STA according to the second link parameters; and
transmitting the second portion to the CE STA in coordination with the assisting AP, and wherein the master AP transmits the second portion to the CE STA according to the first link parameters.

16. The method of claim 15, wherein the first link parameters and/or the second link parameters includes a modulation and coding scheme (MCS).

17. The method of claim 16, wherein the first link parameters and/or the second link parameters further include one or more of a bandwidth, a channel, a resource unit (RU) allocation, a number of spatial streams, a space-time block coding (STBC), smoothing information, beamforming information, transmit power, sequencing, and/or a physical (PHY) layer property.

18. The method of claim 17, further comprising one of:
receiving second link characteristics for the second link between the assisting AP and the CE STA and to base the second link parameters, at least partially, on the second link characteristics; or receiving the second link parameters for the second link between the assisting AP and the CE STA from the assisting AP to incorporate the second link parameters into the frame.

* * * * *

UNITED STATES PATENT AND TRADEMARK OFFICE
CERTIFICATE OF CORRECTION

PATENT NO. : 10,159,060 B2
APPLICATION NO. : 15/392075
DATED : December 18, 2018
INVENTOR(S) : Laurent Cariou et al.

It is certified that error appears in the above-identified patent and that said Letters Patent is hereby corrected as shown below:

On the Title Page

At item (54) "Title", Column 1, Line 3, after "BASIC" insert -- SERVICE --, therefore.

Signed and Sealed this
Thirtieth Day of April, 2019

Andrei Iancu
*Director of the United States Patent and Trademark Office*